United States Patent
Mildren

(10) Patent No.: US 9,882,344 B2
(45) Date of Patent: Jan. 30, 2018

(54) MID TO FAR INFRARED DIAMOND RAMAN LASER SYSTEMS AND METHODS

(75) Inventor: Richard Paul Mildren, Abbotsford (AU)

(73) Assignee: Macquarie University, North Ryde (AU)

(*) Notice: Subject to any disclaimer, the term of this patent is extended or adjusted under 35 U.S.C. 154(b) by 0 days.

(21) Appl. No.: 13/580,859

(22) PCT Filed: Feb. 24, 2011

(86) PCT No.: PCT/AU2011/000201
§ 371 (c)(1),
(2), (4) Date: Oct. 30, 2012

(87) PCT Pub. No.: WO2011/103630
PCT Pub. Date: Sep. 1, 2011

(65) Prior Publication Data
US 2013/0043392 A1  Feb. 21, 2013

(30) Foreign Application Priority Data
Feb. 24, 2010  (AU) .................. 2010900786

(51) Int. Cl.
*H01S 3/30* (2006.01)
*H01S 3/094* (2006.01)
(Continued)

(52) U.S. Cl.
CPC .......... *H01S 3/30* (2013.01); *H01S 3/094038* (2013.01); *H01S 3/094076* (2013.01);
(Continued)

(58) Field of Classification Search
CPC ....... H01S 3/30; H01S 3/1086; H01S 2302/02
(Continued)

(56) References Cited

U.S. PATENT DOCUMENTS

| 4,213,060 A * | 7/1980 | Byer et al. ............. 359/327 |
| 7,259,906 B1 * | 8/2007 | Islam .................... 359/334 |

(Continued)

FOREIGN PATENT DOCUMENTS

| AU | WO2005AU01470 | 9/2005 | ............. H01S 3/108 |
| AU | WO2007AU00433 | 4/2007 | ............. H01S 3/108 |

(Continued)

OTHER PUBLICATIONS

Mildren, et al. "CVD-diamond external cavity Raman laser at 573 nm", Optical Society of America, Optics Express, vol. 16, No. 23, Nov. 10, 2008.

(Continued)

*Primary Examiner* — Michael Carter
(74) *Attorney, Agent, or Firm* — Wolf, Greenfield & Sacks, P.C.

(57) ABSTRACT

A mid- to far-infrared solid state Raman laser system comprising a resonator cavity comprising: an input reflector adapted to be highly transmissive for light with a first wavelength in the range of about 3 to about 7.5 micrometers for admitting the first beam to the resonator cavity; and an output reflector adapted to be partially transmissive for light with a second wavelength greater than about 5.5 micrometers for resonating the second wavelength in the resonator and for outputting an output beam, the input reflector further being adapted to be highly reflective at the second wavelength for resonating the second wavelength in the resonator; and a solid state diamond Raman material located in the resonator cavity for Raman shifting the pump beam and generating the second wavelength.

29 Claims, 13 Drawing Sheets

(51) Int. Cl.
*H01S 3/108* (2006.01)
*H01S 3/16* (2006.01)

(52) U.S. Cl.
CPC ....... *H01S 3/094084* (2013.01); *H01S 3/1086* (2013.01); *H01S 3/163* (2013.01); *H01S 3/1691* (2013.01); *H01S 2302/00* (2013.01); *H01S 2303/00* (2013.01)

(58) Field of Classification Search
USPC ........................................... 372/3, 4
See application file for complete search history.

(56) References Cited

U.S. PATENT DOCUMENTS

| | | | |
|---|---|---|---|
| 2001/0028090 A1* | 10/2001 | Braun et al. | 257/371 |
| 2003/0043453 A1* | 3/2003 | Smith et al. | 359/334 |
| 2005/0163169 A1* | 7/2005 | Lawandy et al. | 372/3 |
| 2007/0064748 A1 | 3/2007 | Mirov et al. | |
| 2008/0170289 A1* | 7/2008 | Rice et al. | 359/334 |
| 2009/0297429 A1* | 12/2009 | Vohra et al. | 423/446 |
| 2010/0246610 A1* | 9/2010 | Mirov et al. | 372/10 |
| 2011/0054451 A1* | 3/2011 | Schunemann et al. | 606/3 |
| 2011/0176563 A1* | 7/2011 | Friel | C30B 25/02 |
| | | | 372/3 |

FOREIGN PATENT DOCUMENTS

| | | |
|---|---|---|
| EP | 0 444 949 A2 | 9/1991 |
| WO | WO 2009/042134 A2 | 4/2009 |

OTHER PUBLICATIONS

Canadian Examination Report dated Nov. 18, 2016 for Canadian Application No. 2,790,861.

Mildren et al., Highly efficient diamond Raman laser. Optics Letters. Optical Society of America. Sep. 15, 2009; 34(18):2811-13.

Mildren, The Outlook for Diamond in Raman Laser Applications. Materials Research Society Symposium Proceedings. Dec. 3, 2009;1203: 12 pages.

* cited by examiner

MID TO FAR INFRARED DIAMOND RAMAN LASER SYSTEMS AND METHODS

CROSS-REFERENCE TO RELATED APPLICATIONS

This application is a §3.71 U.S. national stage filing of PCT/AU2011/000201 filed Feb. 24, 2011, which is the PCT of AU App. 2010900786 filed Feb. 24, 2010, both of which applications are fully incorporated herein by reference.

TECHNICAL FIELD

The present invention relates to laser systems with output wavelengths in the mid- to far-infrared spectral region and methods for operation of those lasers and in particular to mid- to far-infrared Raman laser systems and methods.

The invention has been developed primarily for use as solid state laser systems utilising Raman conversion in solid state diamond gain crystals for generating coherent radiation in the mid- to far-infrared spectral regions and will be described hereinafter with reference to, this application. However, it will be appreciated that the invention is not limited to this particular field of use.

BACKGROUND

Any discussion of the background art throughout the specification should in no way be considered as an admission that such background art is prior art, nor that such background art is widely known or forms part of the common general knowledge in the field.

Crystalline Raman lasers are efficient converters of pump lasers to longer wavelengths and higher beam quality. The Group IV crystal diamond, which can now be synthesized with excellent optical quality, is especially interesting and has recently been shown to be an outstanding optically-pumped Raman laser material with efficiency, wavelength range, and power exceeding all other materials owing to its high thermal conductivity, high Raman gain, and broad optical transmission range. By all of these measures, diamond is outstanding among all other known materials and has the potential to enable miniature Raman lasers of unprecedented average power and wavelength range. The recent availability of high optical quality synthetic diamond crystals grown by chemical vapour deposition (CVD) is currently enabling a surge of interest in diamond Raman laser development.

Much like the electronic industry, lasers are being developed with ever increasing power, speed and frequency range. Almost all fields of science and technology now benefit from laser technology in some way and demand a range of specifications that will include output wavelength, beam power, temporal format, coherence and system parameters such as footprint and efficiency. Thus there is an ongoing search for alternatives to the optical gain material that is fundamental to laser performance. Diamond is highly attractive as a laser material as it promises capabilities well beyond that possible from other materials in accordance with its extreme properties.

Most diamond laser research to date has concentrated on doped diamond for color center lasers, semiconductor diode lasers and rare earth doped lasers. Success has been very limited except from perhaps color center lasers relying on the nitrogen vacancy that have been demonstrated with an optical-to-optical conversion efficiency of 13.5% [see S. C. Rand and L. G. DeShazer, Opt. Lett. 10, 481 (1985)]. The major challenge for diamond as a laser host is the incorporation of suitable concentrations of color centers or active laser ions into the tightly bonded lattice either by substitution or interstitially. On the other hand, Raman lasers rely on stimulated scattering from fundamental lattice vibrations and thus do not require doping. Though the principle of optical amplification is distinct from conventional lasers that rely on a population inversion, in many ways Raman lasers have similar basic properties to other laser-pumped lasers. Raman lasers can be thought functionally as laser converters that bring about a frequency downshift and improved beam quality. Their development has been most often driven by the need for laser wavelengths that are not fulfilled by conventional laser media and find use in a diverse range of fields such as in telecommunications, medicine, bio-diagnostics, defence and remote sensing.

Synthetic (CVD) single crystal diamond has become available in the last few years with size, optical quality and reproducibility well suited for implementation in Raman lasers. Diamond's starkly different optical and thermal properties compared to "conventional" materials are of substantial interest for extending Raman laser capabilities. Diamond has the highest Raman gain coefficient of all known materials (approximately 1.5 times higher than barium nitrate) and outstanding thermal conductivity (more than two orders of magnitude higher than most other Raman crystals) and optical transmission range (from 0.230 µm and extending to beyond 100 µm, with the exception of the 3-6 µm range due multiphonon interactions). Most solid state Raman materials are only transmissive at wavelengths less than 4 micrometers (silicon being one of the only exceptions).

The potential for diamond to generate radiation in the mid-infrared, long wave infrared, far-infrared and terahertz is of major interest for many applications and may address a serious lack of powerful and practical laser sources at wavelengths between 6 and 100 µm. The wavelength range is in a notorious gap between current optical and electronic microwave sources, but is a rich arena for applications and research in physics, biology, material science, chemistry and medicine including several that are of major significance such as remote and stand-off sensing of bioagents, contraband and toxic chemicals, industrial process monitoring and control, environmental monitoring and biological 'lab-on-a-chip' devices. This wavelength region is vitally important for sensing, probing and interacting with our environment and encompasses the molecular "fingerprint" region at one end (5 to 20 µm) to "T-rays" (50 to 200 µm) that safely penetrate many organic materials.

For example, lasers are commonly used in surgical procedures as they offer good precision, the option for keyhole fibre delivery, and reduced bleeding. A major limitation to the range of indications and efficacy is caused by the low spatial precision with which the laser beam power is deposited into the tissue. For example, neurosurgical procedures like the excising of brain tumours cannot often be carried out with current laser technology as the beam power is not deposited in the cells directly but rather chromophores that surround the cells such as water and melanin. The wavelength 6.45 µm has been identified, however, as a key absorption wavelength for providing strong absorption by the amide-II band of proteins and relatively low absorption in water. Lasers at 6.45 µm potentially offer surgeons the capability to ablate tissue with resolution at the single cell level (<5 µm) and a new option to treat otherwise difficult indications. Proof of principle studies undertaken with a free-electron laser at Vanderbilt University USA [see Edwards, G. S., Nature 371, p 416 (1994)] demonstrated efficient ablation and very low collateral damage, and the system was subsequently used in successful human brain and ophthalmic surgical trials [see for example Koos, K. et al., Lasers Surg. Med. 27, p 191 (2000)]. Free electron lasers are, however, large scale (building-sized), costly and inefficient installations only suited to small trials. More practical alternatives have been investigated, but the size and performance requirements for widespread use has yet to be met. The major hurdle to be overcome is that, to date, no solid state laser material has been identified as being capable of generating the required wavelengths and power levels for efficient operation.

The extension of the operation of solid-state, laser-based optical parametric oscillators has been considered using nonlinear materials such as ZnGeP, AgGaSe$_2$, and GaAs, but at present surface damage by the pump laser pulse is an unsolved problem and wavelengths are limited to less than approximately 20 µm. Though quantum cascade semiconductor diode lasers are very promising devices, there are several severe limitations that have impeded their widespread acceptance; peak and average output powers are low (<100 mW), the tuning range is narrow, and cryogenic cooling is often required. The only source that offers wide tunability and high power are multi-million dollar large-scale installations based on high energy electron accelerators (eg., free electron lasers and synchrotrons), which are irrelevant to most practical applications. As a result, the development of practical tabletop or smaller sources as proposed here stands to make a major impact.

Although diamond has long been known to be an interesting Raman laser material, it has only been the last few years in which Raman lasers have been demonstrated. In fact, not long after the discovery of the Raman effect by Raman and Krishnan in 1928, Ramaswamy discovered the strong and isolated 1332 cm$^{-1}$ Raman mode in diamond [see C. Ramaswamy, Indian J. Phys. 5, 97 (1930)]. Diamond was one of the first crystals that were used to exhibit SRS [see G. Eckhardt, D. P. Bortfeld, and M. Geller, Appl. Phys. Lett. 3, 137, (1963)]. Though in principle Raman lasers made can be from natural diamond, indeed resonant effects in an uncoated natural diamond crystal were observed in 1970 substantial diamond Raman laser development has been limited due primarily to the lack of a reproducible supply of optical quality material provided by synthetic growth methods, which is only recently becoming available.

An important technical challenge results from the two- and three-phonon band in diamond (>0.5 cm$^{-1}$) which absorbs strongly in the range 3-6 µm. For pump wavelengths longer than 3.8 µm, it is important to consider strong absorption of the pump. Absorption of the first Stokes wavelength is also a consideration for pump wavelengths shorter than 3.2 µm. A further challenge for generating long wavelengths is the diminishing gain that normally occurs when Raman scattering longer wavelengths.

It is an object of the present invention to substantially overcome or at least ameliorate one or more of the disadvantages of the prior art, or at least to provide a useful alternative.

SUMMARY OF THE INVENTION

The following definitions are provided as general definitions and should in no way limit the scope of the present invention to those terms alone, but are put forth for a better understanding of the following description.

Unless defined otherwise, all technical and scientific terms used herein have the same meaning as commonly understood by those of ordinary skill in the art to which the invention belongs. For the purposes of the present invention, the following terms are defined below.

The articles "a" and "an" are used herein to refer to one or to more than one (i.e. to at least one) of the grammatical object of the article. By way of example, "an element" refers to one element or more than one element.

The term "about" is used herein to refer to quantities that vary by as much as 30%, preferably by as much as 20%, and more preferably by as much as 10% to a reference quantity.

Throughout this specification, unless the context requires otherwise, the words "comprise", "comprises" and "comprising" will be understood to imply the inclusion of a stated step or element or group of steps or elements but not the exclusion of any other step or element or group of steps or elements.

Although any methods and materials similar or equivalent to those described herein can be used in the practice or testing of the present invention, preferred methods and materials are described. It will be appreciated that the methods, apparatus and systems described herein may be implemented in a variety of ways and for a variety of purposes. The description here is by way of example only.

According to a first aspect there is provided a solid state Raman laser system comprising a solid state Raman material, the laser system adapted to generate an Raman shifted output beam having an output wavelength greater than about 5.5 micrometers. The output wavelength may be in the range of between about 6 and about 10 micrometers. The output wavelength may be in the range of between about 6 and about 8 micrometers. The output wavelength may be between 5.5 µm and 150 µm, for example about 5.5 µm, or 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 25, 30, 35, 40, 45, 50, 55, 60, 65, 70, 75, 80, 85, 90, 95, 100, 110, 120, 130, 140, or about 150 µm.

The laser system may comprise a pump source for generating pump light at a first wavelength having a wavelength greater than about 3 micrometers to about 7.5 micrometers, or about 3 µm to about 5 µm or about 3 µm to about 4 µm, or about 3.2 µm to about 3.8 µm, for example about 3.0 µm, or 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, or about 7.5 µm, wherein the pump light is converted in the Raman material to the output wavelength. The pump source may be capable of end-pumping or side pumping the Raman material. In alternate arrangements, the Raman material may be both end-pumped and side pumped. For a diamond Raman laser material, side-pumping of the Raman material may be particularly advantageous where the pump wavelength is in the range of between about 3.8 to 7.5 µm. The pump beam may be a polarised pump beam. The polarisation of the pump beam may be oriented such that it is parallel to the appropriate crystal axes for increased Raman gain. The polarisation of the polarised pump beam may be parallel or approximately parallel to the <111>, <100> or <110> axes of the diamond crystal lattice. For a Brewster cut diamond crystal, the polarisation of the resultant Raman-converted Stokes light may be polarised in the same orientation as the pump light to minimise reflection losses of the Stokes light at the Brewster cut facets. The pump beam may have a linewidth less than or about equal to the linewidth of the Raman gain of the Raman material. The pump beam may have a linewidth with a half-width of approximately less than or equal to about ~1.6 cm$^{-1}$, for example between about 0.01 and about 1.6 cm$^{-1}$, or about 0.01 cm$^{-1}$, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5 or about 1.6 cm$^{-1}$. Alternatively, the linewidth may be between about 0.01 cm$^{-1}$ and about 10 cm$^{-1}$, for example about 0.01 cm$^{-1}$, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.5, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 97, 9.8, 9.9 or about 10 cm$^{-1}$.

The Raman shifted output beam may be at a wavelength corresponding to a first Stokes shift in the Raman material. The Raman laser system may comprise an undoped solid state Raman material, wherein the output wavelength from the laser system is greater than 5.5 micrometers. The Raman material may be diamond. The Raman material may be undoped diamond. The Raman material may be single crystal diamond. The Raman material may comprise two or more single crystals of diamond, which may be bonded to each other (for example by an adhesive-free contact bonding procedure such as diffusion bonding). The Raman material may be either polycrystalline or single crystal diamond. The Raman material may be low birefringence diamond. The diamond Raman material may have low nitrogen impurity content. The nitrogen impurity content may be between about 0.1 ppb and about 10000 ppb, or between 0.1 ppb and 500 ppb or between about 0.1 ppb and about 200 ppb, for example about 0.1 ppb, or 0.2, 0.3, 0.4, 0.5, 0.6, 0.7, 0.8, 0.9, 1, 2, 3, 4, 5, 10, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 300, 400, 500, 600, 700, 800, 900, 1000, 1250, 1500, 1750, 2000, 2500, 3000, 3500, 4000, 4500, 5000, 5500, 6000, 6500, 7000, 7500, 8000, 8500, 9000, 9500 or about 10000 ppb.

According to a second aspect, there is provided a solid state Raman laser system comprising an undoped solid state Raman material, wherein the output wavelength from the laser system is greater than 5.5 micrometers. The Raman material may be diamond. The Raman material may be either polycrystalline or single crystal diamond. The Raman material may be an isotopically pure diamond material (crystal) (eg, enriched carbon-12). The Raman material may be low birefringence diamond. The diamond Raman material may have low nitrogen impurity content. The nitrogen impurity content may be between about 0.1 ppb and about 10000 ppb, or between 0.1 ppb and 500 ppb or between about 0.1 ppb and about 200 ppb, for example about 0.1 ppb, or 0.2, 0.3, 0.4, 0.5, 0.6, 0.7, 0.8, 0.9, 1, 2, 3, 4, 5, 10, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 300, 400, 500, 600, 700, 800, 900, 1000, 1250, 1500, 1750, 2000, 2500, 3000, 3500, 4000, 4500, 5000, 5500, 6000, 6500, 7000, 7500, 8000, 8500, 9000, 9500 or about 10000 ppb. The output wavelength may be between 5.5 μm and 200 μm, for example about 5.5 μm, or 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 10.5, 11, 11.5, 12, 12.5, 13, 13.5, 14, 14.5, 15, 15.5, 16, 16.5, 17, 17.5, 18, 18.5, 19, 19.5, 20, 25, 30, 35, 40, 45, 50, 55, 60, 65, 70, 75, 80, 85, 90, 95, 100, 110, 120, 130, 140, 150, 160, 170, 180, 190, or about 200 μm. The laser system may be pumped by a pump source having a first wavelength greater than about 3 micrometers to about 7.5 micrometers, or about 3 μm to about 5 μm or about 3 μm to about 4 μm, or about 3.2 μm to about 3.8 μm, for example about 3.0 μm, or 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, or about 7.5 μm. The pump source may be tunable. The output wavelength may be tunable.

According to a third aspect, there is provided a mid- to far-infrared solid state Raman laser system. The laser system may comprise a resonator. The resonator may comprise an input reflector adapted to be highly transmissive for light with a first wavelength in the range of about 3 to about 7.5 micrometers for admitting a pump beam with the first wavelength into the resonator cavity. The resonator may further comprise an output reflector adapted to be partially transmissive for light with a second wavelength greater than about 5.5 micrometers for resonating the second wavelength in the resonator and for outputting an output beam. The input reflector may be highly reflective at the second wavelength for resonating the second wavelength in the resonator. The laser system may further comprise a solid state Raman material located in the resonator cavity for Raman shifting the pump beam and generating the second wavelength. The second wavelength may be greater than about 5.5 micrometers. Alternatively, the first wavelength may be in the range of between about 3 to about 4 micrometers. Alternatively, the first wavelength may be in the range of about 3.2 to about 3.8 micrometers. The Raman material may be diamond. The Raman material may be undoped diamond. The Raman material may be single crystal diamond. The Raman material may comprise two or more single crystals of diamond, which may be bonded to each other (for example by an adhesive-free bonding procedure such as diffusion bonding). The Raman material may be either polycrystalline or single crystal diamond. The Raman material may be low birefringence diamond. The diamond Raman material may have low nitrogen impurity content. The nitrogen impurity content may be between about 0.1 ppb and about 10000 ppb, or between 0.1 ppb and 500 ppb or between about 0.1 ppb and about 200 ppb, for example about 0.1 ppb, or 0.2, 0.3, 0.4, 0.5, 0.6, 0.7, 0.8, 0.9, 1, 2, 3, 4, 5, 10, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 300, 400, 500, 600, 700, 800, 900, 1000, 1250, 1500, 1750, 2000, 2500, 3000, 3500, 4000, 4500, 5000, 5500, 6000, 6500, 7000, 7500, 8000, 8500, 9000, 9500 or about 10000 ppb.

According to an arrangement of the third aspect, there is provided a mid- to far-infrared solid state Raman laser system comprising: a resonator cavity, the cavity comprising: an input reflector adapted to be highly transmissive for light with a first wavelength in the range of about 3 to about 7.5 micrometers for admitting a pump beam with the first wavelength into the resonator cavity; and an output reflector adapted to be partially transmissive for light with a second wavelength greater than about 5.5 micrometers for resonating the second wavelength in the resonator and for outputting an output beam, the input reflector further being adapted to be highly reflective at the second wavelength for resonating the second wavelength in the resonator; the laser system further comprising a solid state Raman material located in the resonator cavity for Raman shifting the pump beam an generating the second wavelength. Alternatively, the first wavelength may be in the range of between about 3 to about 4 micrometers. Alternatively, the first wavelength may be in the range of about 3.2 to about 3.8 micrometers.

The highly reflective input reflector may be greater than 70% reflective at the second wavelength, i.e. between about 70% and 99.99% or between about 90% and 99.99% reflective, for example about 70%, 75%, 80%, 85%, 90%, 91%, 92%, 93%, 94%, 95%, 96%, 97%, 98%, 99%, 99.5%, 99.9%, 99.95%, or about 99.99% reflective at the second wavelength. The partially transmissive output reflector may be between about 1% and about 80% transmissive at the second wavelength, or between about 20% and 50% transmissive, for example may be about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75% or about 80% transmissive at the second wavelength.

The first wavelength (also known interchangeably herein as the pump wavelength, where a pump beam is a beam with the pump/first wavelength, and is generated/provided by a pump source, which definition is relevant for each of the aspects, arrangements and examples disclosed herein) may be less than about 3.8 micrometers; and the second wavelength (also known interchangeably herein as the output wavelength, where an output beam is a beam with the output/second wavelength, which definition is relevant for each of the aspects, arrangements and examples disclosed herein) may be greater than about 5.5 micrometers, or greater than about 6 micrometers. The first wavelength may be in the range of about 3 to about 7.5 µm. Alternatively, the first wavelength may be in the range of between about 3 to about 4 micrometers. Alternatively, the first wavelength may be in the range of about 3.2 to about 3.8 micrometers. The laser system may comprise a pump source for generating pump light having at the first wavelength, being greater than about 3 micrometers to about 7.5 micrometers, or about 3 µm to about 5 µm or about 3 µm to about 4 µm, or about 3.2 µm to about 3.8 µm, for example the first wavelength may be about 3.0 µm, or 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, or about 7.5 µm wherein the pump light is converted in the Raman material to the output wavelength. The first wavelength may be generated by a tunable pump source.

The pump source may be capable of end-pumping or side pumping the Raman material. In alternate arrangements, the Raman material may be both end-pumped and side pumped. For a diamond Raman laser material, side-pumping of the Raman material may be particularly advantageous where the pump wavelength is in the range of between about 3.8 to 7.8 µm. The pump beam may be a polarised pump beam. The polarisation of the pump beam may be oriented such that it is parallel to the appropriate crystal axes for increased Raman gain. The polarisation of the resultant Raman-converted Stokes light may be polarised in the same orientation as the pump light to minimise absorption losses of the Stokes light in the Raman material.

The Raman material may be an undoped Raman material. The Raman material may be diamond. The Raman material may be a single-crystal diamond Raman material. The diamond Raman material may be derived from a chemical vapour deposition fabrication process. The Raman material may be cooled. The cooling of the Raman material may minimise multiphonon interactions in the Raman material and may reduce the absorption coefficient of the material. Isotopically pure diamond crystals may also be advantageous for reducing absorption at some wavelengths (eg., see Thomas R. Anthony, William Banholzer, Properties of diamond with varying isotopic composition, Diamond and Related Materials, Volume 1, Issues 5-6, Proceedings of the Second European Conference on Diamond, Diamond-like and Related Coatings, 15 Apr. 1992, Pages 717-726, ISSN 0925-9635, DOI: 10.1016/0925-9635(92)90197-V.).

The laser system may be a continuous wave laser system, wherein the resonator cavity is a high finesse resonator cavity for light at the second wavelength, the finesse of the resonator cavity at the second wavelength being greater than 100. Alternatively, the finesse of the resonator cavity at the second wavelength may be greater than 15, greater than 200, greater than 250, greater than 300, greater than 400, greater than 500, greater than 1,000, greater than 2,000, greater than 3,000, greater than 4,000, greater than 5,000, greater than 6,000, greater than 7,000, greater, than 8,000, greater than 9,000, greater than 10,000, greater than 15,000, greater than 20,000, greater than 25,000, greater than 30,000, greater than 35,000, greater than 40,000, greater than 45,000. The finesse of the resonator cavity at the second wavelength may be in the range 100 to 50,000, 100 to 45,000, 100 to 40,000, 100 to 35,000, 100 to 30,000, 100 to 25,000, 100 to 20,000, 100 to 15,000, 100 to 10,000, 100 to 9,000, 100 to 8,000, 100 to 7,000, 100 to 6,000, 100 to 5,000, 100 to 4,000, 100 to 3,000, 100 to 2,000, 100 to 1,000, or 100 to 500, and may be approximately 100, 150, 200, 250, 300, 350, 400, 450, 500, 550, 600, 650, 700, 750, 800, 850, 900, 950, 1,000, 1,100, 1,200, 1,300, 1,400, 1,500, 1,600, 1,700, 1,800, 1,900, 2,000, 2,250, 2,500, 2,750, 3,000, 3,250, 3,500, 3,750, 4,000, 4,250, 4,500, 4,750, 5,000, 6,000, 7,000, 8,000, 9,000, 10,000, 11,000, 12,000, 13,000, 14,000, 15,000, 16,000, 17,000, 18,000, 19,000, 20,000, 25,000, 30,000, 35,000, 40,000, 45,000, or about 50,000 or greater.

The second wavelength may be a first order Stokes wavelength, or a second order Stokes wavelength or a combination thereof.

The Raman laser system may be an end-pumped laser system. The Raman laser system may be a side-pumped laser system. The Raman laser system may be a non-collinearly pumped laser system.

The pump source may be adapted to generate a pulsed pump beam comprising pump pulses at the first wavelength of intensity between about 0.3 GW/cm$^2$ and about 60 GW/cm$^2$, or alternatively between about 1 and 60 GW/cm$^2$, about 1 and 30 GW/cm$^2$, about 1 and 20 GW/cm$^2$, about 1 and 10 GW/cm$^2$, about 2 and 5 GW/cm$^2$, for example about 0.3 GW/cm$^2$, or 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5 20, 25, 30, 35, 40, 45, 50, 55 or about 60 GW/cm$^2$. The pump source may be adapted to generate a pulsed pump beam comprising pump pulses at the first wavelength with a pulse width between about 1 ns and 100 ns. The pulse width may be between about 1 ns and 20 ns, or between about 1 ns and 15 ns, or 1 ns and 10 ns, or 5 ns and 20 ns or 5 ns and 15 ns. The intensity may be greater than about 0.3 GW/cm$^2$. In alternate arrangements the pulse width may be between about 1 ns and about 1 µs, or between about 1 µs and 1 ms, or between about 1 ms and about 1 s. Alternatively still, the pump source may be adapted to generate a continuous wave pump beam.

The output wavelength may be in the range of between about 5.5 micrometers to about 8 micrometers. Alternatively, the output wavelength may be in the range of between about 5.5 to 7.5 micrometers, or between about 5.5 and about 7 micrometers, or between about 5.5 and 6.5 micrometers, or between about 3 and about 6 micrometers. Alternatively, the output wavelength may be greater than about 8 micrometers. The second wavelength may be in the range of about 8 micrometers to about 200 micrometers. The second wavelength may, be in the terahertz region of the spectrum with wavelength greater than 100 micrometers, for example the output wavelength may, be between about 5.5 μm and about 200 μm, for example about 5.5 μm, or 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 10.5, 11, 11.5, 12, 12.5, 13, 13.5, 14, 14.5, 15, 15.5, 16, 16.5, 17, 17.5, 18, 18.5, 19, 19.5, 20, 25, 30, 35, 40, 45, 50, 55, 60, 65, 70, 75, 80, 85, 90, 95, 100, 110, 120, 130, 140, 150, 160, 170, 180, 190, or about 200 μm. The output wavelength may be tunable.

In any one of the above aspects or arrangements, the first wavelength may be derived from a pump laser source selected from the group of: an optical parametric oscillator, a solid state thulium laser, a solid state holmium laser, a solid-state erbium laser; and a chromium-doped zinc-selenide laser ($Cr3^+$:ZnSe). The erbium, thulium or holmium laser may be a Raman-shifted laser. For example, it may be a Raman shifted Er:YAG laser operating at a wavelength of about 3.8 micrometers. The pump laser source may be an optical parametric oscillator comprising an additional optical amplifier. The optical amplifier may be an optical parametric amplifier. The pump source may be adapted to generate pump radiation at a first wavelength in the range of between about 3 and about 7.5 micrometers. The pump radiation may have a wavelength in the range of between about 3 and about 4 micrometers, or alternatively between about 3.2 and about 3.8 micrometers, for example about 3.0 μm, or 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, or about 7.5 μm. The first wavelength may be generated by a tunable pump source. The pump radiation may have a linewidth less than or about equal to the linewidth of the Raman gain of the Raman material. The pump radiation may have a linewidth with a half-width of approximately less than or equal to about ~1.6 $cm^{-1}$, for example between about 0.5 and about 1.6 $cm^{-1}$, or about 0.5 $cm^{-1}$, or 0.6, 0.7, 0.8, 0.9, 1.0, 1.1, 1.2, 1.3, 1.4, 1.5 or about 1.6 $cm^{-1}$. Alternatively, the linewidth may be between about 0.01 $cm^{-1}$ and about 4 $cm^{-1}$, for example about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.5, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or about 4 $cm^{-1}$. The pump source may be adapted to generate a pulsed pump beam and the pump pulses may have a pulse length of about 100 ns or less. The pulse length may be between about 1 and 100 ns, or between about 1 and 90, 1 and 80, 1 and 70, 1 and 60, 1 and 50, 1 and 40, 1 and 30, 1 and 20, 1 and 10 ns, about, 1 and 5 ns, 2 and 20 ns, 2 and 10 ns, 2 and 5 ns, 5 and 20 ns, or between about 5 ns and 15 ns, or between about 5 ns and 10 ns, for example about 1 ns, or 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95 or about 100 ns. In alternate arrangements the pulse width may be between about 1 ns and about 1 μs, or between about 1 μs and 1 ms, or between about 1 ms and about 1 s. Alternatively still, the pump source may be adapted to generate a continuous wave pump beam. The pump source may be adapted for generation of pump radiation with pulse energy greater than 1 milli-Joule. The pump pulse energy may be between about 0.1 mJ and about 10 J, for example about 0.1 mJ, 0.2, 0.3, 0.4, 0.5, 0.6, 0.7, 0.8, 0.9 or 1.0 mJ, 2, 3, 4, 5, 6, 7, 8, 9 or 10 mJ, 15, 20, 25, 30, 35, 40, 45, 50, 100, 200, 300, 400, 500, 600, 700, 800, 900, 1000, 1100, 1200, 1300, 1400, 1500, 1600, 1700, 1800, 1900, 2000, 3000, 4000, 5000, 6000, 7000, 8000, 9000 or about 10000 mJ (10 J). As will be appreciated, the pump pulse energy delivery and conversion efficiency in the Raman material is dependent on the energy density of the pump beam in the material, i.e. the size of the pump beam in the Raman material. The pulse energy, in general, may be approximately the pulse duration times the pulse energy time the spot size in the Raman material. For example, for a pulse duration of about 10 ns, the pump pulse energy in the Raman material may be between about 0.1 $GW/cm^2$ and about 60 $GW/cm^2$, or alternatively between about 1 and 45 $GW/cm^2$, about 1 and 30 $GW/cm^2$, about 1 and 20 $GW/cm^2$, about 1 and 10 $GW/cm^2$, about 2 and 5 $GW/cm^2$, for example about 0.1 $GW/cm^2$, or 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5 20, 25, 30, 35, 40, 45, 50, 55 or about 60 $GW/cm^2$. For alternate pulse widths, the pulse energy may change accordingly to the above relation. Alternatively, for a continuous wave pump beam lower pulse energy may be sufficient, for example the energy density may be between about 0.1 $mW/cm^2$ and about 10 $MW/cm^2$, and may be about 0.1 $MW/cm^2$, or 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9 or about 10 $MW/cm^2$.

In alternate arrangements, the Raman material may comprise a waveguide for guiding light at the first and/or second wavelengths in the resonator cavity.

The Raman laser system may be an intracavity Raman system and the resonator cavity may be adapted for inputting pump light with a wavelength less than 3.2 micrometers, and the laser system may further comprise: a laser material located in the resonator cavity for generating the first wavelength in the range of between about 3 to about 7.5 micrometers, wherein the laser material is adapted to be pumped by a pump beam from an external pump source adapted to generate the first wavelength. The first wavelength generated by the laser material may be in the range of between about 3 and about 4 micrometers, or alternatively between about 3.2 and about 3.8 micrometers. The first wavelength generated by the laser material may be for example about 3.0 μm, or 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, or about 7.5 μm.

In any one of the aspects or arrangements, the first wavelength may be derived from a tunable laser source such that the second wavelength may be tuned by tuning the first wavelength. The second wavelength may be tunable through the range of about 5.5 micrometers to about 200 micrometers. The second wavelength may be continuously tunable through the range of about 5.5 micrometers to about 200 micrometers, for example about 5.5 μm, or 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 10.5, 11, 11.5, 12, 12.5, 13, 13.5, 14, 14.5, 15, 15.5, 16, 16.5, 17, 17.5, 18, 18.5, 19, 19.5, 20, 25, 30, 35, 40, 45, 50, 55, 60, 65, 70, 75, 80, 85, 90, 95, 100, 110, 120, 130, 140, 150, 160, 170, 180, 190 or about 200 μm.

According to a fourth aspect, there is provided a method for providing a mid- to far-infrared solid state Raman laser system. The method may comprise providing a resonator cavity comprising an input reflector adapted to be highly transmissive for light with wavelength in the range of about 3 to about 7.5 micrometers for admitting a pump beam to the resonator cavity; and an output reflector adapted to be partially transmissive for light with wavelength greater than about 5.5 micrometers for resonating the second wavelength in the resonator and for outputting an output beam. The input reflector may be highly reflective at the second wavelength for resonating the second wavelength in the resonator. The method may further comprise providing a solid state Raman material located in the resonator cavity. The method may further comprise directing a pump beam with the first wavelength into the resonator cavity and incident on the Raman material thereby inducing stimulated Raman scattering in the Raman material and generating the second wavelength. The method may further comprise outputting the output beam with the second wavelength from the resonator cavity. The first wavelength may be in the range of between about 3 and about 4 micrometers, or alternatively between about 3.2 and about 3.8 micrometers.

According to an arrangement of the fourth aspect, there is provided a method for providing a mid- to far-infrared solid state Raman laser system comprising: providing a resonator cavity comprising an input reflector adapted to be highly transmissive for light with wavelength in the range of about 3 to about 7.5 micrometers for admitting a pump beam to the resonator cavity; and an output reflector adapted to be partially transmissive for light with wavelength greater than about 5.5 micrometers for resonating the second wavelength in the resonator and for outputting an output beam the input reflector further being adapted to be highly reflective at the second wavelength for resonating the second wavelength in the resonator; providing a solid state Raman material located in the resonator cavity for Raman shifting the pump beam an generating the output beam; directing the pump beam into the resonator cavity and incident on the Raman material thereby inducing stimulated Raman scattering in the Raman material and generating the output beam; and outputting the output beam from the resonator cavity. The first wavelength may be in the range of between about 3 and about 4 micrometers, or alternatively between about 3.2 and about 3.8 micrometers. The first wavelength (also known as the pump wavelength) may be for example about 3.0 µm, or 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, or about 7.5 µm. The first wavelength may be generated by a tunable pump source. The output beam may have a wavelength of between 5.5 µm and 200 µm, for example about 5.5 µm, or 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 10.5, 11, 11.5, 12, 12.5, 13, 13.5, 14, 14.5, 15, 15.5, 16, 16.5, 17, 17.5, 18, 18.5, 19, 19.5, 20, 25, 30, 35, 40, 45, 50, 55, 60, 65, 70, 75, 80, 85, 90, 95, 100, 110, 120, 130, 140, 150, 160, 170, 180, 190, or about 200 The output wavelength may be tunable. The highly reflective input reflector may be greater than 90% reflective at the second wavelength, i.e. between say 90% and 99.99% reflective, for example 90%, 91%, 92%, 93%, 94%, 95%, 96%, 97%, 98%, 99%, 99.5%, 99.9%, 99.95%, or about 99.99% reflective at the second wavelength. The partially transmissive output reflector may be between about 1% and about 80% transmissive at the second wavelength, or between about 20% and 50% transmissive, for example may be about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75% or about 80% transmissive at the second wavelength.

According to a fifth aspect, there is provided a method of laser treatment. The method may comprise providing a laser system as claimed in any one of the first to third aspects. The method may further comprise providing a pump beam with a first wavelength of about 3.47 micrometers. The method may further comprise directing the pump beam into the resonator cavity, and incident on the Raman material thereby inducing stimulated Raman scattering in the Raman material and generating an output beam with a second wavelength of about 6.45 micrometers. The method may further comprise directing the output beam to a selected treatment area to perform a laser treatment to the treatment area.

According to an arrangement of the fifth aspect, there is provided a method of laser treatment comprising: providing a laser system as claimed in any one of the first to third aspects providing a pump beam with a first wavelength of about 3.47 micrometers; directing the pump beam into, the resonator cavity and incident on the Raman material thereby inducing stimulated Raman scattering in the Raman material and generating an output beam with a second wavelength of about 6.45 micrometers; and directing the output beam to a selected treatment area to perform a laser treatment to the treatment area. The method may be adapted for neurosurgery.

According to a sixth aspect, there is provided a method of remote sensing. The method may comprise providing a laser system as claimed in any one of the first to third aspects. The method may further comprise providing a pump beam with a first wavelength in the range of about 3 to 7.5 micrometers. The method may further comprise directing the pump beam into the resonator cavity and incident on the Raman material thereby inducing stimulated Raman scattering in the Raman material and generating a beam at a second wavelength having a wavelength in the range of about 5.5 micrometers to about 100 micrometers. The method may further comprise outputting the second wavelength from the resonator cavity as an output beam. The method may further comprise directing the output beam towards an object or into an environment where an object or environmental substance is suspected to be located. The method may further comprise detecting backscattered radiation from the object or environmental substance. The method may further comprise processing the detected radiation thereby sensing the presence or absence of the object or environmental substance.

According to an arrangement of the sixth aspect, there is provided a method of remote sensing comprising: providing a laser system as claimed in any one of the first to third aspects, providing a pump beam with a first wavelength in the range of about 3 to 7.5 micrometers; directing the pump beam into the resonator cavity and incident on the Raman material thereby inducing stimulated Raman scattering in the Raman material and generating a beam at a second wavelength having a wavelength in the range of about 5.5 micrometers to about 100 micrometers; outputting the second wavelength from the resonator cavity as an output beam; directing the output beam towards an object or into an environment where an object or environmental substance is suspected to be located; detecting backscattered radiation from the object or environmental substance; and processing the detected radiation thereby sensing the presence or absence of the object or environmental substance. The pump beam may have a wavelength in the range of between about 3 and about 4 micrometers, or alternatively between about 3.2 and about 3.8 micrometers.

In any of the above aspects or arrangements, the second wavelength may be a first order Stokes wavelength, or a second order Stokes wavelength or a combination thereof.

The first or pump wavelength, $\lambda_1$, and the second or output wavelength, $\lambda_2$, may be a combination ($\lambda_1$, $\lambda_2$) and where the second/output wavelength is a first Stokes Raman-shifted wavelength of the first/pump wavelength, the combination ($\lambda_1$, $\lambda_2$) may be, for example ($\lambda_1 \approx 3.0$ µm, $\lambda_2 \approx 5.0$ µm), or (3.1 µm, 5.3 µm), (3.2 µm, 5.6 µm), (3.3 µm, 5.9 µm), (3.4 µm, 6.2 µm), (3.5 µm, 6.6 µm), (3.6 µm, 6.9 µm), (3.7 µm, 7.3 µm), (3.8 µm, 7.7 µm), (3.9 µm, 8.1 µm), (4.0 µm, 8.6 µm), (4.1 µm, 9.0 µm), (4.2 µm, 9. µm 5), (4.3 µm, 10.1 µm), (4.4 µm, 10.6 µm), (4.5 µm, 11.2 µm), (4.6 µm, 11.9 µm), (4.7 µm, 12.6 µm), (4.8 µm, 13.3 µm), (4.9 µm, 14.1 µm), (5.0 µm, 15.0 µm), (5.1 µm, 15.9 µm), (5.2 µm, 16.9 µm), (5.3 µm, 18.0 µm), (5.4 µm, 19.2 µm), (5.5 µm, 20.6 µm), (5.6 µm, 22.0 µm), (5.7 µm, 23.7 µm), (5.8 µm, 25.5 µm), (5.9 µm, 27.6 µm), (6.0 µm, 29.9 µm), (6.1 µm, 32.5 µm), (6.2 µm, 35.6 µm), (6.3 µm, 39.2 µm), (6.4 µm, 43.4 µm), (6.5 µm, 48.4 µm), (6.6 µm, 54.6 µm), (6.7 µm, 62.3 µm), (6.8 µm, 72.2 µm), (6.9 µm, 85.3 µm), (7.0 µm, 103.6 µm), (7.1 µm, 130.8 µm), (7.2 µm, 175.8 µm), (7.3 µm, 264.1 µm), (7.4 µm, 516.8 µm), or ($\lambda_1 \approx 7.5$ µm, $\lambda_2 \approx 7500$ µm). Alternatively, where the second/output wavelength is a second Stokes Raman-shifted wavelength of the first/pump wavelength, the combination ($\lambda_1$, $\lambda_2$) may be, for example ($\lambda_1 \approx 3.0$ µm, $\lambda_2 \approx 14.9$ µm), (3.1 µm, 17.8 µm), (3.2 µm, 21.7 µm), (3.3 µm, 27.3 µm), (3.4 µm, 36.1 µm), (3.5 µm, 51.8 µm), (3.6 µm, 87.9 µm), or (3.7 µm, 258.4 µm). The Raman-converted (down-shifted) output wavelength, $\lambda_2 = 1/v_2$, may be determined for a given pump wavelength, $\lambda_1 = 1/v_1$, by the relation $v_2 = v_1 - v_R$ (with each of $v_1$, $v_2$ and $v_R$ expressed in units of [cm$^{-1}$]), where $v_R$ is the characteristic Raman shift of the Raman material, for example in diamond, $v_R \approx 1332$ cm$^{-1}$.

BRIEF DESCRIPTION OF THE DRAWINGS

Arrangements of the Raman laser system will now be described, by way of an example only, with reference to the accompanying drawings wherein.

DETAILED DESCRIPTION

Figure 1A:
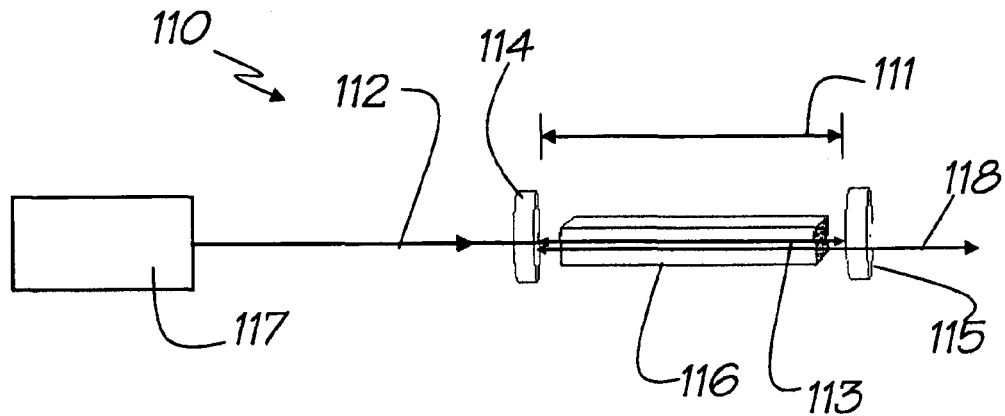
FIG. 1A is a schematic of a basic external cavity Raman laser architecture.

Disclosed herein are Raman laser systems for generation of output radiation in the mid- to far-infrared spectral region of the spectrum (greater than about 5.5 µm), extending to the terahertz region (greater than 100 µm). In particular, the laser systems disclosed comprises a solid state diamond Raman material for Raman shifting a first wavelength by stimulated Raman scattering in the Raman material to generate the mid- to far-infrared output radiation from the laser system. Both external Raman laser systems and internal Raman laser systems are envisaged for generation of the output radiation. The diamond Raman material may be single crystal diamond, or polycrystalline diamond. Alternatively, the diamond Raman material may comprise more than one single crystal, which may be bonded to each other by an adhesive-free process such as diffusion bonding. The Raman Material may be low birefringence diamond. The diamond Raman material may have low nitrogen impurity content, for example less that 10000 ppb, or less than 5000 ppb, or less than 1000 ppb, or less than 500 ppb, or less than 200 ppb less than 150 ppb or less than 120 ppb or less than 100 ppb of nitrogen impurities in the diamond material, thereby to minimise absorption losses (e.g. for the Raman-shifted output radiation) in the 7 to 11 μm region. The nitrogen impurity content may be between about 0.1 ppb and about 10000 ppb, or between 0.1 ppb and 500 ppb or between about 0.1 ppb and about 200 ppb, for example about 0.1 ppb, or 0.2, 0.3, 0.4, 0.5, 0.6, 0.7, 0.8, 0.9, 1, 2, 3, 4, 5, 10, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 300, 400, 500, 600, 700, 800, 900, 1000, 1250, 1500, 1750, 2000, 2500, 3000, 3500, 4000, 4500, 5000, 5500, 6000, 6500, 7000, 7500, 8000, 8500, 9000, 9500 or about 10000 ppb. The Raman material may be either polycrystalline or single crystal diamond. The Raman material may be low birefringence diamond. The diamond Raman material may have low nitrogen impurity content.

Raman lasers rely on the phenomenon of stimulated Raman scattering (SRS) for optical amplification in the laser resonator. Input pump photons of a first wavelength having a wavelength $\lambda_1$ and frequency $\omega_1 = \omega_p = \lambda_1/c$ (where c is the speed of light) excite a normal mode of vibration in the crystal lattice of the Raman material and the remaining energy is carried away as Stokes shifted photons of a second wavelength $\lambda_2$ and with frequency $\omega_2 = \omega_s = \lambda_2/c$. The first and second wavelengths may also be expressed in terms of wavenumbers, $v_1 = 1/\lambda_1$ and $v_2 = 1/\lambda_2$ respectively and are expressed in units of reciprocal centimeters [cm$^{-1}$]). The Raman-converted (down-shifted) Stokes wavelength, $\lambda_2 = 1/v_2$, may be determined for a given pump wavelength, $\lambda_1 = 1/v_1$, by the relation $v_2 = v_1 - v_R$ (with each of $v_1$, $v_2$ and $v_R$ expressed in units of [cm$^{-1}$]), where $v_R$ is the characteristic Raman shift of the Raman material. For example in diamond, the characteristic Raman frequency is $v_R \approx 1332$ cm$^{-1}$.

In solid state materials, the probability for Raman scattering is higher for materials that change in polarizability, $\alpha$, with small displacements dq in the lattice vibration i.e., for large $d\alpha/dq$. The rate of change of the polarizability, $d\alpha/dq$, is a measure of the amount of distortion experienced by the electron cloud in the Raman material as a result of the incident light and its square, $(d\alpha/dq)^2$, is directly proportional to the spontaneous Raman cross-section.

SRS requires the interaction of a Stokes photon with two pump photons and is thus a third-order nonlinear optical process (similar to the nonlinear processes of third harmonic generation, four-wave mixing and two-photon absorption). Amplification of the Stokes field intensity $I_s$ with Stokes frequency $\omega_s$ as it propagates through the Raman medium on the z-axis is given by the relation $$dI_s/dz = g.I_p.I_s \quad (1)$$

where $I_p$ is the intensity of the pump field with wavelength $\lambda_p = \lambda_1$, $I_s$ is the intensity of the Raman shifted Stokes field with wavelength $\lambda_s = \lambda_2$, and the gain coefficient g is proportional to $(d\alpha/dq)^2$.

Under steady-state conditions where the pump pulse duration is greater than the dephasing time, $T_2$, in which coherent lattice phonons remain in the material, the Raman gain coefficient is given by the relation:

$$g = k/m.\omega_s.(d\alpha/dq)^2.T_2 \quad (2)$$

where m is the reduced mass of the vibrating atoms and k is a constant (however, for pump pulses of duration comparable or shorter than the phonon dephasing time $T_2$, the rate of accumulation of coherent phonons needs to be considered and the effective gain is reduced).

Diamond has an exceptionally high Raman gain coefficient owing to high values of both $(d\alpha/dq)^2/m$ and $T_2$. There are several interesting characteristics of Raman lasers worth noting:

1) The equations for Raman amplification are closely analogous to conventional laser gain involving a population inversion. In the Raman case, the spontaneous Raman cross-section is analogous to the stimulated emission cross-section material parameter and the population inversion term is replaced by $I_p$.

2) Since gain is only present while a pump field is present, there is generally close temporal overlap between the output and pump pulses. As a result Raman lasers are often thought of as a nonlinear optical converters. Laser energy is not stored in the medium in the same way as population absorption lasers.

3) In contrast to nonlinear optical conversion process such as harmonic generation and four-wave mixing, Raman generation is automatically phase matched. That is, momentum is conserved in the interaction essentially independent of the momentum vectors of the pump and output beam. Momentum is conserved in the interaction since the scattered phonon in the Raman material carries away any recoil and consequently Raman lasers have several important properties. The phase properties of the Raman beam are constrained by design of the Raman resonator and as a result the spatial properties of the Raman output beam are often better than the pump, a property that enables Raman lasers to act as beam quality converters in a process often referred to as "Raman beam cleanup". This is unlike a phase-matched nonlinear conversion processes where the phase properties of the output beam are directly related to that of the pump beam, an effect leads to exacerbation of distortions and hot-spots in the beam profile. Raman lasers can also be pumped at a range of angles non-collinear to the output beam axis such as in the side-pumping configuration often used in conventional lasers. In a non-collinear pumping arrangement, the pump beam substantially overlaps in the Raman-active medium with the resonator mode of the laser cavity, but the pump beam is not collinear with the resonator mode axis as they pass through the Raman-active medium. The side-pumping arrangement is an example of a non-collinear pumping configuration where the pump beam is at or near 90° to the resonator mode axis, however, smaller angles less than 90° may also be used. A further corollary of automatic phase matching, is that the Raman process can be cascaded to generate an integral number of Stokes shifts. By careful Raman laser design, efficient generation at a selected Stokes order or at multiple Stokes orders can be achieved.

Figure 1B:
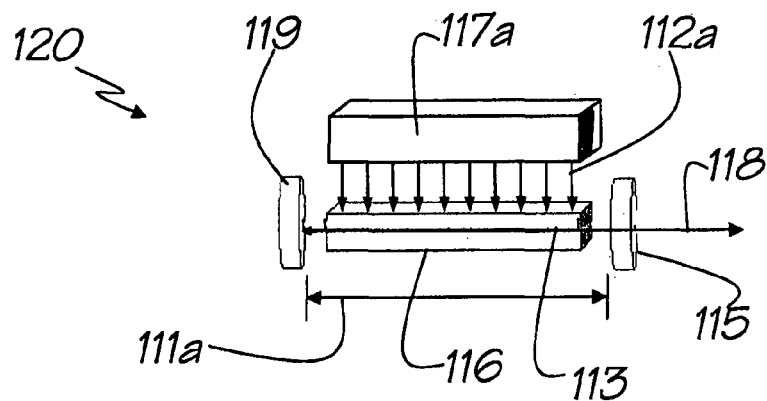
FIG. 1B is a schematic of a side-pumped external cavity Raman laser architecture.

Raman laser designs can be divided into the two categories of external cavity and intracavity Raman lasers as shown in their most basic and well known forms as shown in FIGS. 1A and 1B. For external cavity Raman lasers 110 as shown in FIG. 1A, Raman active medium 116 is located with a resonator cavity 111 comprising input and output reflectors (114 and 115 respectively). The reflectors are designed such that a pump beam 112 of a first wavelength from an external pump source 117 is admitted into the resonator 111 to be incident on the Raman active medium 116, which converts the pump beam 112 to a Raman converted beam 113 (Stokes beam) at a second wavelength which resonates in the resonator 111. The input mirror 114 should be as highly transmitting to the pump wavelength as practically possible, and the output mirror 115 reflective at the pump wavelength to allow a double pass of the pump radiation 112 through the Raman active medium 116. The output reflector/mirror 115 is also adapted to transmit a portion of the Raman-converted beam 113 to produce a Raman output beam 118 at the second wavelength.

The spectral and spatial properties of the Raman output beam 118 are dictated by the resonator design. A high order Stokes output can be selected for example by designing the output mirror 115 to output couple at the desired Stokes order but to reflect lower Stokes orders such that these lower Stokes orders are resonated in the cavity 111 and are sequentially converted to successively higher Stokes orders in the Raman material 116. External Raman lasers 110 operate most efficiently for pulsed pump lasers; however, continuous wave operation is also possible with suitable cavity design. A major attraction of the external resonator arrangement is that it can be a simple add-on to an unmodified pump source, thus allowing the approach to leverage available laser systems as pump sources.

In a example arrangement of a mid- to far-infrared and terahertz external Raman laser system, the mid- to far-infrared solid state Raman laser system comprises a resonator 111 having an input reflector 114 adapted to be highly transmissive for light with a first wavelength for admitting the first (input) beam to the resonator cavity 111. The first wavelength may be in the range of about 3 to about 7.5 micrometers, or alternatively between about 3 and 5 micrometers, 3 and 4 micrometers, or between about 3.2 and about 3.8 micrometers. The input reflector 114 is further adapted to be highly reflective at the wavelength of the desired mid- to far-infrared output radiation 118. The input reflector 114 will generally comprise optical coatings thereon to achieve the desired transmission and reflectivity characteristics. The resonator 111 also comprises an output reflector 115, adapted to be partially transmissive for light with a second wavelength greater than about 5.5 micrometers for resonating the second wavelength in resonator 111 and for outputting output beam 118. The input reflector 114 is further highly reflective at the second wavelength for resonating the second wavelength in the resonator 111.

A solid state Raman material 116 is located in the resonator cavity 111 such that, when in use, an incident pump beam 112 at the first wavelength is Raman shifted to generate the second wavelength by stimulated Raman scattering in the Raman material 116, wherein the second wavelength is greater than about 5.5 micrometers. A portion of the Raman generated radiation in the resonator at the second wavelength is transmitted by the output reflector to form a mid- to far-infrared output beam 118 when the system is in operation. The partially transmissive output reflector 115 is between about 1% and about 80% transmissive at the Raman-shifted second wavelength, or alternatively between about 20% and about 50% transmissive. The input reflector is typically greater than 90% reflective at the second wavelength, i.e. between say 90% and 99.99% reflective.

In this external resonator arrangement 110, a pump source 117 is required to generate the input pump beam 112 at the first wavelength, which in use, is directed to the Raman laser system for generation of the desired mid- to far-infrared output beam 118. The pump beam 112 may be focused into the Raman material with a suitable lens (not shown) as would be appreciated by the skilled addressee. In the end pumped arrangement, the pump beam 112 may be focused such that the waist of the focused pump beam is less than or approximately equal to the diameter of the mode of the resonator cavity 111, and the Rayleigh range of the pump beam 112 is approximately equal to the length of the Raman material 116. The pump laser source may be selected from the group of: an optical parametric oscillator, a solid state thulium laser, a solid state holmium laser, and an erbium laser, and may be adapted to generate pump radiation in the range of between about 3 µm and about 7.5 µm.—In alternate arrangements, the pump source may be an optical parametric oscillator (OPO) adapted to generate radiation in the range of between about 3 µm and about 7.5 µm.

The laser system may further comprise a heat sink, which is in thermal contact with the Raman material, thereby to remove excess heat from the surface of the Raman material during operation. The heat sink may, for example, be a thermoelectric cooling device. The laser system may further comprise a cooling mechanism for cooling the Raman laser material below room temperature, thereby to minimise multiphonon absorption (and increase the Raman gain), particularly for radiation in the range of about 4 to about 5.5 micrometers. The cooling mechanism may, for example, cool the Raman material to liquid nitrogen temperatures, or below as required (i.e. liquid nitrogen or an alternate cooling liquid may be used to cool the Raman material used in any of the Raman laser systems disclosed herein).

In further arrangements, the Raman material may comprise a waveguide for guiding light at the first and/or second wavelengths in the resonator cavity. Waveguides enable confinement either of the pump or Stokes radiation (or both) for greater distances in the Raman material than that otherwise possible due to diffraction. They are therefore of interest for decreasing the threshold for Raman laser action and increase the efficiency when using low pump peak powers. Ideally, the waveguides are low-loss and allow good spatial overlap between the pump and Stokes fields. To date, waveguides in diamond have been created by micromachining rib waveguides [see for example Hiscocks, M. P. et al, "Diamond waveguides fabricated by reactive ion etching," Opt. Express 16, 19512-19519 (2008)]. Also, creation of low-loss buried channel waveguides may be possible by ion implantation [see for example Olivero, P. et al, "Controlled variation of the refractive index in ion-damaged diamond", presented at 20$^{th}$ European Conference on Diamond, Greece (2009)] and direct laser writing (see for example femtosecond laser writing in crystalline Nd:YAG [see for example Ródenasl, A. et al, "Refractive index change mechanisms in femtosecond laser written ceramic Nd:YAG waveguides: micro-spectroscopy experiments and beam propagation calculations", Applied Physics B: Lasers and Optics, Volume 95, Pages 85-96 (2009)]).

In particular arrangements, the solid state Raman material 116 is diamond Which has a characteristic Raman shift of $v_R$=1332 cm$^{-1}$. Advantageously, the diamond solid state Raman material 116 is a low birefringence single crystal diamond. Thus, by using an input beam 112 having a first wavelength in the range of between about 3.2 µm and about 3.8 µm, an output beam 118 with a second wavelength in the range of between about 5.5 µm and about 7.7 µm can be generated utilising the first Stokes Raman shift of the input radiation 112 in the diamond Raman material 116. In other arrangements, both the input 114 and the output 115 reflectors of the resonator 111 may be further adapted to be highly reflective for radiation in the range of about 5.5 to about 7.7 μm, thereby resonating radiation in this wavelength range within resonator 111, which is subsequently converted by a cascaded Raman process in the diamond Raman material 116 to the second Stokes wavelength.

The output reflector 115 may be adapted to be at least partially transmissive at the second Stokes wavelength to allow a portion of radiation in the resonator at this wavelength to exit the resonator and form the output radiation 118. Using input/pump beam 112 having a wavelength in the range of about 3.2 μm to about 3.8 μm an optimising the transmissivity and reflectivity characteristics of the input 114 and output 115 reflectors of the resonator 111 for generation of the second Stokes would result in an output beam 118 having a wavelength in the range of between about 21 μm to greater than about 200 μm.

An alternative external cavity Raman laser architecture is a side-pumped arrangement 120 as shown schematically in FIG. 1B (where like numbers refer to like elements) where the Raman material is pumped at an angle non-collinear to the output beam axis. The pump source 117a is arranged so as to emit pump light 112a which pumps the mode of the resonator 111a along the length of the Raman material 116 on the axis of the resonating mode of resonator 111a. Side-pumping of the laser crystal may have a higher. Raman threshold, however may still result in high optical-optical conversion efficiency, and is more easily scalable and enables greater flexibility in where the resonator components can be placed.

Side-pumping of a laser medium rather than along the laser axis notably changes laser design constraints that includes several advantages such as relaxed requirements on resonator mirror coatings, reduced incident power density and shortened penetration of the pump laser within the active medium. Side pumping spatially decouples the pump and output beams and enables several design freedoms in the laser configuration. The key freedoms include the ability to pump the laser at wavelengths that may experience significant absorption by the Raman medium. The loss may be reduced by as much as the ratio of the crystal length and width which may be an enhancement of several orders of magnitude. Advantages also include much greatly reduced constraints on mirrors and for input coupling beams with a greater range of peak and average power.

Although side-pumping is a well known method for power scaling in conventional population inversion lasers, application in Raman lasers has only been studied recently in any detail. These studies, undertaken by the inventor, have shown that the efficiency and threshold pump intensity are similar to those observed in end-pumped systems for the case of a dielectric crystalline Raman laser.

Since the absorption depth of Raman media at the pump wavelength is generally very much longer than for inversion lasers, multi-axis pumping is straightforward for an arbitrary crystal shape and dimension providing an interesting approach to coherent beam combination for high brightness applications. Side-pumping also provides an alternative that may enable efficient operation in cases where end-pumping is problematic due to either the long optical path through the medium or due to end-mirror coating constraints. Side pumping may be particular advantageous for diamond Raman lasers pumped at wavelengths that experience significant multiphonon absorption (i.e., for pump wavelengths in the range 2-6 microns). A transverse configuration will reduce pump absorption by as much as the ratio of the beam diameter to the Raman material length. A similar principle may apply in systems where the pump wavelength is in the vicinity of the material bandgap. Such a configuration can also minimize parasitic absorption of the pump radiation since the path length of pump rays through the medium can be as short as the Raman laser beam diameter. This is contrast to end-pumping arrangements in which the path length of the pump radiation is the order of the length of the Raman material. Thus in side pumped arrangements the path length and the resulting absorption can be orders of magnitude lower. In particular arrangements, for example where absorption of the pump radiation in the Raman material is high (i.e. between about 3.8 and about 5.5 μm or between about 7 and about 11 μm in diamond), it may be advantageous to both end-pump and side-pump the Raman material simultaneously.

Although the theory underpinning gain and threshold for SRS was established during the 1960s, there are few detailed treatments of SRS in crystals that deal explicitly with scattering geometry and the associated dynamics of the vibrational wave. Shen and Bloembergen [see Y. R. Shen and N. Bloembergen, "Theory of Stimulated Brillouin and Raman Scattering," Phys. Rev. 137, A1787-A1805 (1965)] specifically investigated SRS as a function of the optical phonon wavevector. The problem is adequately dealt with classically since the interaction involves a large ensemble of photons. For near threshold behaviour the depletion of pump field $E_p$ can be neglected and it is also assumed that most vibrational centres are in the ground state so that the anti-Stokes wave can be neglected. Coupled equations for the Stokes field $E_s \sim \exp[i(k_s.r-\omega_s t)]$ and vibrational waves $Q_v \sim \exp[i(k_v.r-\omega_v t)]$ were obtained using a Lagrangian method:

$$\beta^2 \cdot \nabla^2 Q_v^* + (\omega_0^2 - \omega_v^2 + i2\omega_v\Gamma) \cdot Q_v^* = \left(N \cdot \frac{d\alpha}{dQ_v}\right) \cdot E_p^* \cdot E_s^* \quad (3)$$

$$\nabla \times (\nabla \times E_s) - (\varepsilon_s \omega_s^2/c^2) \cdot E_s = \left(N \cdot \frac{d\alpha}{dQ_v}\right) 4\pi \omega_s^2/c^2 \cdot Q_v^* \cdot E_p$$

where $Q_v$ is the relative displacement of nuclear positions normalized by the $\sqrt{(2\rho)}$ where $\rho$ is the reduced mass density, $\in_s$ is the permittivity of free space of the Stokes wave and c is the speed of light. The $\beta^2$ term allows for the propagation of momentum where $\beta \ll \omega_0/k_v$ is equal to the acoustic phonon speed in the Raman medium. The equations describe a damped harmonic vibration with the driving term $E_p.E_s$ and Maxwell's equation for the Stokes field with the driving term $Q_v.E_p$ respectively. The damping constant for the vibrational wave is. $\Gamma(=1/T_2$ where $T_2$ is the phonon dephasing time). The strength of the Raman coupling is $N.d\alpha/dQ_v$ where $\alpha$ is the optical polarizability tensor and N the number density of scattering centres, and is related to the steady-state Raman gain coefficient (see Equation 6) by $g_s=2\pi\omega_s^2(N.d\alpha/dq)^2/c^2 k_s\omega_v\Gamma$. Conservation of energy requires $\omega_p=\omega_s\omega_v$.

Figure 1C:
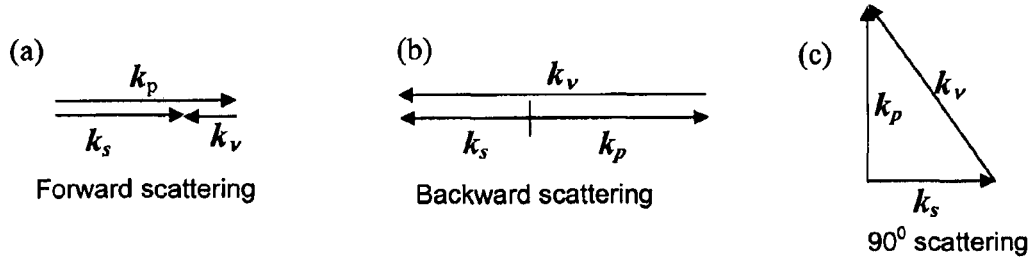
FIG. 1C depicts phase matching diagrams showing the range of $k_v$ vector magnitudes and directions for forward, backward and 90° scattering.

From Equation (3) it is seen that the phonon-photon coupling strength is independent of the propagation and depends only on pump and Stokes polarization and the properties of $\alpha$. The only directional dependence comes from the requirement for momentum conservation ($k_p=k_s+k_v$). For 90° scattering, the magnitude of the phonon wavevector is between that for forward and backward scattering as shown in FIG. 1C(a). However, it is almost always generally assumed that the phonon wavevector is very small compared to the Brillioun zone boundary and phonon dispersion low. For the example of Raman backscattering at visible wavelengths, $k_v$ is the order of $10^5$ cm$^{-1}$ or approximately 1% of the zone boundary. As a result, the variation in resonant frequency of the optical phonon $\omega_v^0=(\omega_0^2-\beta^2.k_v^2)^{0.5}$ is negligible and phonons of frequency within the Raman linewidth can generated in momentum conserving interactions independent of the scattering direction. It has also been suggested that $\Gamma$ is dependent on the phonon wavevector magnitude, in which case Raman gain would be affected in the steady-state regime. The author is unaware of any evidence for significant $\Gamma$ dependence on $k_v$ and the effect is assumed negligible. Thus it is concluded that Raman gain is to a first order independent of scattering geometry.

In the side-pumped arrangement 120 of FIG. 1B, the reflectivity requirements of the input reflector can be relaxed since it does not have to transmit the pump light 112a, and therefore may be replaced with a reflector 119 which is adapted to be highly reflective at the resonating Raman shifted wavelength 113 generated by the Raman material 116. Again, the pump beam 112a may be focused into the Raman material with a suitable lens (not shown). In this side-pumped configuration, as would be appreciated by the skilled addressee, the pump beam 112a may be focused such that the waist of the cylindrically focused pump beam is less than or approximately equal to the diameter of the mode waist of resonator cavity 111a, and the Rayleigh range of the pump beam 112a is approximately greater than or approximately equal to the resonator beam waist. In side-pumped lasers it may be important to use unstable resonators in order to generate a beams with high beam quality.

Figure 15A:
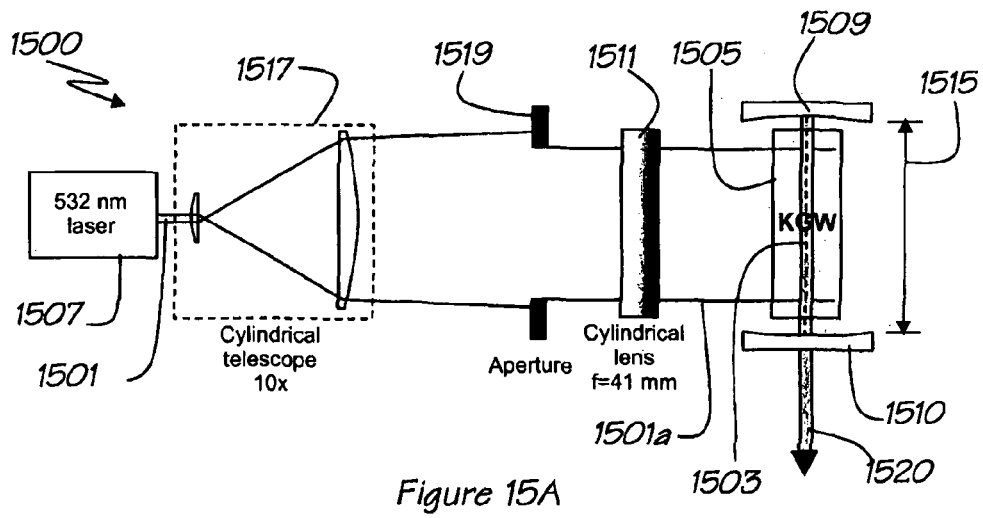
FIG. 15A is schematic arrangement suitable for a side pumped diamond Raman laser.

An example side pumped arrangement is depicted in the Raman laser 1500 of FIG. 15A in which the pump beam 1501 is perpendicular to the Raman resonator axis 1503. The arrangement is demonstrated using a potassium gadolinium tungstate (KGW) Raman material, however the arrangement is readily adaptable to a diamond Raman material also. A Raman material—a rectangular KGW crystal 1505—was side-pumped using a line focus (using cylindrical lens 1511) from a 532 nm pump laser 1507 and Raman resonator optics 1509 and 1510 placed with their axis perpendicular to the pump beam direction as shown to form resonator 1515. The Raman laser threshold of this arrangement was 4.5 mJ and a maximum output energy in output beam 1520 was 2.7 mJ obtained using 12 mJ of pump energy with a slope efficiency of 47%. The length of the KGW Raman crystal 1505 was 25 mm. The cavity length of resonator 1515 was 34 mm. The Raman crystal 1505 was aligned so that $N_m$ axis is approximately parallel to the polarization of the pump beam 1501 to provide maximum gain d$\alpha$/dQ for the 901 cm$^{-1}$ Raman shift of KGW. The reflector 1509 was a broadband high reflector for wavelengths in the range 530-650 nm (CVI-TLM2) and the output coupler 1510 was HR at the first Stokes wavelength of 559 nm and 70% T at the second Stokes wavelength of 589 nm (respective to the 532 nm pump radiation from the pump source 1507). The 532 nm pump beam 1501 was TEM$_{00}$ mode and had a pulse duration of about 8 ns. The 6 mm output beam 1501 from the pump source 1507 was expanded in the horizontal direction using a 10× cylindrical telescope 1517. The edges of the expanded pump beam were clipped using an aperture 1519 so that only the central portion of the pump beam 1501 was used and that the pump beam 1501a only illuminates the central 90% of the length of the Raman crystal 1505. Clipping of the edges of the pump beam 1501 ensured that for the range of pump energies used the thresholds for crystal damage was not exceeded for both the end corners of the Raman material 1505 and the bulk region at the most intense region of the line focus of the pump radiation in the Raman crystal 1505. The line focus of pump beam 1501a was formed in the Raman crystal by focusing in the vertical direction using a 41 mm focal length cylindrical lens 1511. The length of the pump stripe in the Raman crystal 1505 was 20 mm long and based on the known beam properties (M$^2$=1.5), the calculated vertical waist minor radius and Rayleigh range were 5 μm and 100 μm respectively.

Figure 15B:
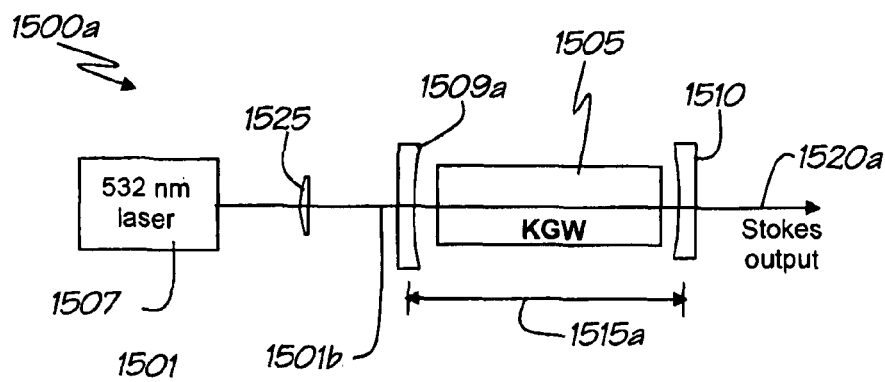
FIG. 15B is schematic arrangement suitable for a end pumped diamond Raman laser.

To contrast performance of a side-pumped with an end-pumped configuration, an end-pumped Raman laser system 1500a was studied as depicted in FIG. 15B. The high reflector in the side-pumped configuration (reflector 1509 of FIG. 15A) was exchanged with a dichroic input coupler 1509a which was 92% transmitting at 532 nm and highly reflective at the Stokes wavelengths. The pump beam 1501 from the same pump source 1507 as used above (532 nm, TEM$_{00}$ mode. pulse duration 8 ns, and M$^2$ beam quality factor of ~1.5) was focused into the same KGW Raman crystal 1505 as used above with a spherical lens 1525, having a focal length f=500 mm, to provide a waist radius and Rayleigh range for the pump beam 1501b of approximately 55 μm and 3.5 cm respectively.

Figure 15C:
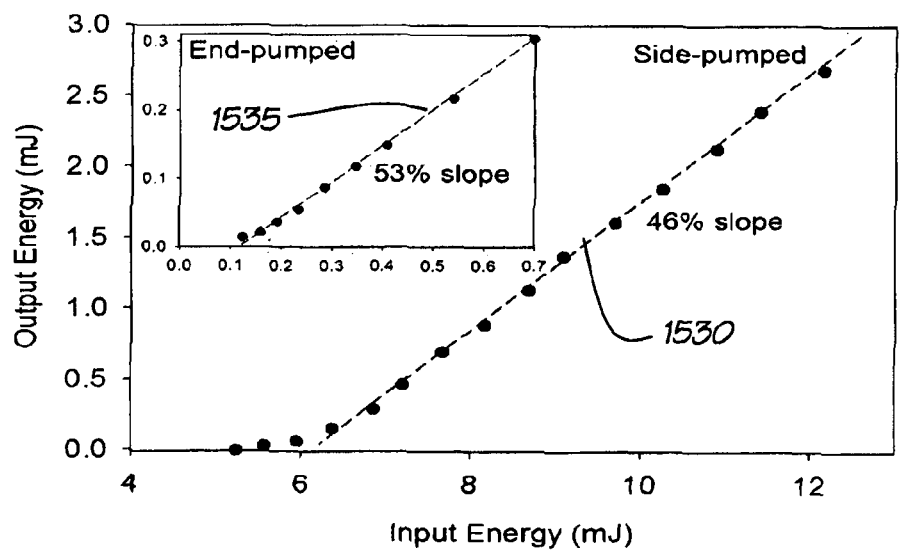
FIG. 15C is a graph of the output energy as a function of the pump energy transmitted by the pump face of the crystal for example side-pumped and end-pumped (inset) configurations of a Raman laser system.

The end-pumped Raman laser 1500a was investigated for pump energies up to 12 mJ. The Raman resonator 1515a was aligned by using the amplified spontaneous Raman scattering observed in the plane of the pump beam 1501b when pumping at high pulse energies. First, the high reflector 1509a was aligned with the pump stripe axis by maximizing the observed double pass first Stokes SRS signal. The output coupler 1510 (as used for the side-pumped configuration) was then put in place and aligned to maximize second Stokes laser output. Energy conversion of the aligned side-pumped Raman laser 1500 is shown in FIG. 15C as discussed below. The pump threshold for Stokes output in output beam 1520a from the side-pumped configuration (see graph 1530 of FIG. 15C) was 6.2 mJ as defined by the linear fit for pump energies >6.5 mJ. In comparison, the energy threshold for the end pumped configuration 1500a of FIG. 15B (see graph 1535 of FIG. 15C) is 0.16 mJ, or 39 times lower than for the side-pumped configuration of FIG. 15A.

The pump intensities at threshold allow the Raman gain coefficients for end- and side-pumping to be compared. The growth in the Stokes intensity near threshold is given by $dI_s=I_s.(g_s.I_p(z)-L).dz$ in each case where the round-trip loss coefficient L is assumed fixed. Thus, at threshold the gain is inversely proportional to the integral of $I_p(z)$ over a round-trip. The $\int I_p(z).dz$ values at threshold are similar to each other within a factor of 2 as shown in Table 1 below along with the parameters used to calculate them. The departure from parity expected from theory is attributed to the invalidity of assumed mode overlap between pump and resonator mode volumes and effects arising from the presence of multiple longitudinal modes in the pump laser. In the side-pumped laser configuration, it should also be noted that the far-field output beam profile was highly asymmetric ($M_x^2$/$M_y^2$~750, with $M_y^2$=1.8 where x is the pump direction) which suggests that the seeding of Stokes modes is substantially different to the end-pumped case (for which $M_{x,y}^2$<1.5).

TABLE 1

Comparison of threshold parameters for side and end-pumped systems.

| | Side pumped | End pumped |
|---|---|---|
| Pulse energy (mJ) | 6.2 | 0.12 |
| Waist dimensions (mm) | 0.01 (w) × 22 (l) | 0.055 radius |
| Pulse duration (ns) | 8 | 8 |
| Power density (MW/cm$^2$) | 360 | 160 |
| $\int$ Ip(z) · dz (GW/cm) | 0.76 | 0.39 |

As can be seen from FIG. 15C, the transverse Raman laser output energy 1530 from the side-pumped configuration 1500 scales linearly with pump energy with slope 46%, slightly lower than the maximum seen using the end-pumped configuration 1500a where the laser output energy 1535 exhibited a slope efficiency of 53%. At maximum pump energy the conversion efficiency in the side-pumped configuration is 22%, which is more than 100 times more efficient than the previous single-pass side-pumped demonstration for nitrobenzene [see J. H. Dennis and P. E. Tannenwald, "Stimulated Raman emission at 90° to the ruby beam," Appl. Phys. Lett. 5, 58-60 (1964)]. Future work at higher pump energies and with improved mode control of the pump beam is expected to enable much higher conversion efficiencies and approaching the maximum values seen from end-pumped lasers which can be >50%.

Figure 1D:
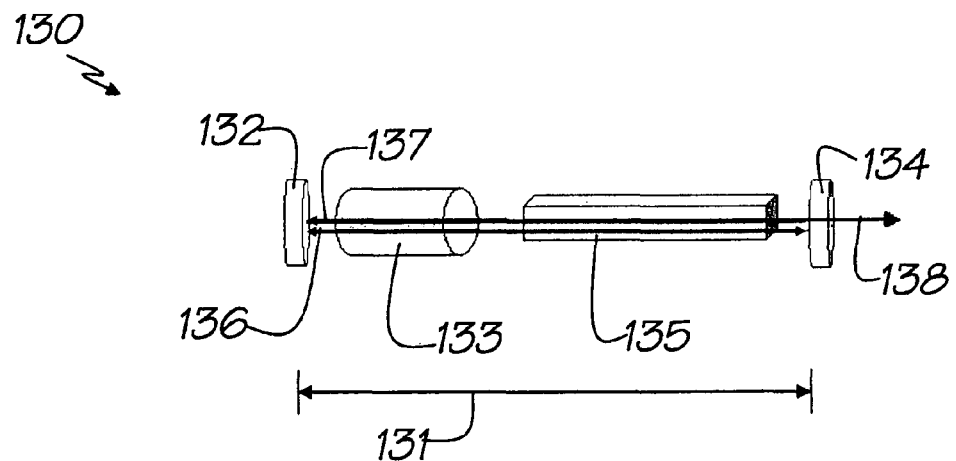
FIG. 1D is a schematic of basic intracavity Raman laser architecture.

Intracavity Raman lasers 130, for example as shown in FIG. 1D, comprise a resonator 131 comprising an end reflector 132 and an output reflector 134, where both a laser medium 133 and a Raman active medium 135 are located in the resonator cavity 131. The laser medium 133 is pumped by an external pump source (not shown) to generate the pump beam at a first wavelength 136 which is converted in the Raman medium 135 to the second wavelength via a Raman conversion process to a Stokes beam. The resonator 131 is adapted to resonate both the first (pump and the second Raman/Stokes) wavelengths with the advantage of enhancing conversion in the Raman medium and enabling reduced pump power thresholds, and architecture well suited to compact diode-pumped devices capable of operating efficiently at low peak powers. The output reflector 134 is partially transmissive at the second wavelength to allow an output beam 138 of the Raman converted wavelength to exit the resonator 131. The advantage of an intracavity system is that a large pump field at the first wavelength (to be converted by the Raman material) and Raman (Stokes) field generated by the Raman crystal at the second wavelength to improve the conversion efficiency to the Raman converted wavelength. Intracavity systems, however, generally are of little benefit if there is large absorption of the intracavity pump field (the first wavelength) in the Raman material. Therefore, for efficient operation of an intracavity Raman laser, the resonator needs to be a high-Q resonator (i.e. minimal losses, including losses due to absorption) at the wavelength of the pump field.

Figure 1E:
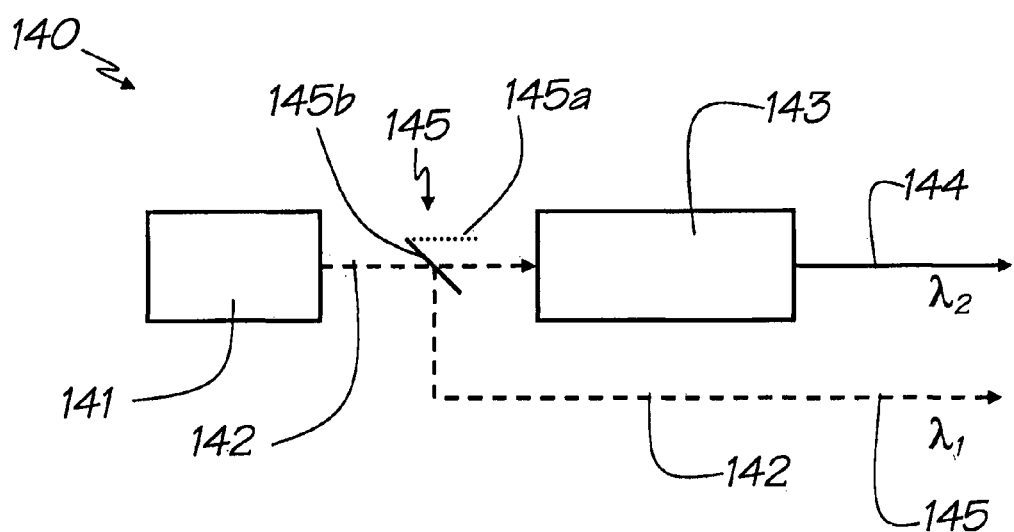
FIG. 1E is a schematic of a basic switchable Raman laser system adapted to selectively switch between output wavelengths.

In further arrangements, the laser system may be adapted to be switchable between two output wavelengths. In some applications, such as in medical procedures, rapid switching between output wavelengths may be particularly advantageous, for example a laser which is capable of delivering switchable output between, say 3.47 μm where water absorption is high, and 6.45 μm where the absorption coefficient is much lower, may be particularly advantageous to enable surgeons to alter the penetration depth and ablation characteristics of the laser system. An example arrangement of a basic switchable Raman laser system 140 adapted to selectively switch between output wavelengths is depicted schematically in FIG. 1E where a pump laser 141 is adapted to generate a pump beam 142 with a pump wavelength $\lambda_1$. The switchable system 140 comprises a switch 145, depicted here as a reflector which is mechanically movable between a first position 145a and a second position 145b. Other switching mechanisms may also be used, including for example polarisation-based methods, or fibre optic switching methods (where the pump beam is delivered via an optical fibre) and others as would be appreciated by the skilled addressee. When the switch 145 is in the first position 145a the pump beam 142 is directed to a Diamond Raman laser system 143, which may be a system as described herein, for generation of an output beam 144 at a Raman-shifted wavelength $\lambda_2$. Alternatively, when the switch 145 is in the second position 145b the pump beam 142 bypasses the Raman system 143 and forms alternate output beam 145 of the switchable laser system. In particular arrangements, of the laser systems 140 may be adapted to deliver either of the output beams 144 and 145 via one or more optical fibre or articulated output delivery systems (not shown) as would be appreciated by the skilled addressee. As an example, the pump laser 141 may generate a pump beam 142 with a wavelength of $\lambda_1=3.47$ μm, and the Raman laser system 143 may be configured to convert the pump beam to an output beam with wavelength $\lambda_2=6.45$ μm, to provide a laser system 140 readily switchable between 3.47 μm and 6.45 μm output wavelengths.

As would be appreciated, in a Raman laser system the output wavelength is dependent upon the wavelength of the pump beam, and example combinations of pump beam wavelength $\lambda_1$ and output beam wavelength $\lambda_2$ are shown in Table 2:

TABLE 2

Pump and output wavelengths in micrometers [μm] for first-Stokes-shifted light in a Diamond Raman laser system

| $\lambda_1$ | $\lambda_2$ |
| --- | --- |
| 3.0 | 5.0 |
| 3.1 | 5.3 |
| 3.2 | 5.6 |
| 3.3 | 5.9 |
| 3.4 | 6.2 |
| 3.5 | 6.6 |
| 3.6 | 6.9 |
| 3.7 | 7.3 |
| 3.8 | 7.7 |
| 3.9 | 8.1 |
| 4.0 | 8.6 |
| 4.1 | 9.0 |
| 4.2 | 9.5 |
| 4.3 | 10.1 |
| 4.4 | 10.6 |
| 4.5 | 11.2 |
| 4.6 | 11.9 |
| 4.7 | 12.6 |
| 4.8 | 13.3 |
| 4.9 | 14.1 |
| 5.0 | 15.0 |
| 5.1 | 15.9 |
| 5.2 | 16.9 |
| 5.3 | 18.0 |
| 5.4 | 19.2 |
| 5.5 | 20.6 |
| 5.6 | 22.0 |
| 5.7 | 23.7 |
| 5.8 | 25.5 |
| 5.9 | 27.6 |
| 6.0 | 29.9 |
| 6.1 | 32.5 |
| 6.2 | 35.6 |
| 6.3 | 39.2 |
| 6.4 | 43.4 |
| 6.5 | 48.4 |
| 6.6 | 54.6 |
| 6.7 | 62.3 |
| 6.8 | 72.2 |
| 6.9 | 85.3 |
| 7.0 | 103.6 |
| 7.1 | 130.8 |
| 7.2 | 175.8 |
| 7.3 | 264.1 |
| 7.4 | 516.8 |
| 7.5 | 7500.0 |

It will be further be appreciated that with the addition of a switching means as disclosed above, the output from a switchable Raman laser system may be switched between the pump beam wavelength $\lambda_1$ and output beam wavelength $\lambda_2$ for a desired combination of $\lambda_1$ and $\lambda_2$ as listed in Table 2.

Crystalline (solid state) Raman materials offer the advantages of a solid-state material, rapid removal of waste heat (compared to gases and liquids), narrow Raman linewidths (compared to glass materials) and high gain coefficients. Materials such as barium nitrate, potassium gadolinium tungstate, barium tungstate, yttrium vanadate and their close crystal relatives have been widely used as Raman materials in Raman laser systems. All these materials feature high gain coefficients and/or high damage thresholds that enable efficient Raman conversion to take place. The Raman shift is typically in the range $v_R$=700-1332 cm$^{-1}$ where diamond has the largest shift of all crystals widely used in Raman lasers of about $v_R$=1332 cm$^{-1}$. The Raman shift allows important wavelength zones such as in the yellow-red, and the eye-safe region near 1.5 μm to be accessed via low-order Stokes shifts from existing laser sources.

Conversion efficiencies in Raman lasers to the Raman-converted. Stokes output can be very high. For external cavity Raman lasers, for which it is straightforward to determine the conversion efficiency in the Raman medium, efficiencies greater than 50% are routinely observed. Some Raman crystals such as the vanadates and the double metal tungstates also enable "self-Raman" laser action in which the Raman medium can act as both the amplifier for the fundamental and Stokes fields. There would be significant potential in self-Raman diamond lasers however, doping of diamond crystals with sufficient concentration of suitable active laser species is currently a challenge.

The above discussion highlights the versatile properties of Raman lasers as optically pumped lasers for wavelength and beam quality conversion. A significant challenge that to date has limited integration of Raman lasers into applications is the weak nature of the Raman process (i.e. the small Raman cross-section). As a consequence, high demands are placed on the spectral power density on the pump beam and the damage threshold of optical elements in order to create efficient devices. Transversely pumped (i.e. side-pumped) Raman lasers are rarely done in practice as these requirements are even more difficult to satisfy. Improvements in pump lasers, optical coatings and Raman material quality over recent years have enabled the field to grow substantially and Raman lasers are finding numerous applications such is in ophthalmology, remote sensing and astronomical guide-stars among many others.

Diamond as a Raman Laser Material

Diamond has many outstanding properties that are particularly attractive for Raman laser systems. Diamond has a particularly high Raman gain coefficient which allows Raman lasers to be made with shorter crystals. Also, the high thermal conductivity and low thermal expansion coefficient is promising for enabling Raman conversion at much higher average powers than in other Raman materials, giving diamond good resistance to optical damage when compared with other Raman materials. The wide transmission range (see FIG. 1F) of diamond compared with alternative solid state Raman materials makes diamond a material of interest for generating wavelengths that fall outside the range of other materials in the infrared region of the spectrum.

Table 3 below contains a detailed comparison of the main parameters of diamond crystals which are important to Raman laser design compared with other common solid state Raman materials. The thermal properties of diamond stand out most notably from the other materials, where the thermal conductivity is over two orders of magnitude higher than the dielectric crystals, and 10 to 15 times higher than silicon. Since SRS deposits heat into the Raman material, this property is crucial for mitigating heat-induced (thermal) lensing and stress forces within the material that introduce birefringence or lead to catastrophic damage. The outstandingly low thermal expansion coefficient of diamond also addresses these problems. Though the thermo-optic coefficient (dn/dT) is at the high end, this will be counteracted by the rapid rate of heat removal and thus the moderation of temperature gradients due to the high thermal conductivity.

TABLE 3

Comparison of diamond's optical parameters with the most commonly used crystalline Raman materials.

| | Crystal Class | Raman Shift (cm$^{-1}$) | Line Width (cm$^{-1}$) | Stationary Raman gain @ 1 μm (cm/GW) | Thermal Conductivity [W/m/K] | Thermal Expansion Coeff ($\times 10^{-6}$ K$^{-1}$) | Thermo-optic coeff (dn/dT) [$\times 10^{-6}$ K$^{-1}$] | Transparency Range [μm] |
|---|---|---|---|---|---|---|---|---|
| LiIO$_3$ | Uniaxial | 822 | 5 | 4.8 | — | — | — | 0.38-5.5 |
| KGd(WO$_4$)$_2$ | Biaxial | 768 | | | 2.5-3.8 | 2.5-17 | -1--5 | 0.3-5.0 |
| | | 901 | 6 | 4 | | | | |
| Ba(NO$_3$)$_2$ | Isotropic | 1047 | 1 | 11 | 1.2 | 13 | -20 | 0.3-1.8 |
| BaWO$_4$ | Uniaxial | 926 | 1.6 | 8.5 | 3 | 11-35 | — | 0.4-3 |
| GdVO$_4$ | Uniaxial | 884.5 | 3 | 4.5 | 5 | — | 4.7 | 0.3-2.5 |
| YVO$_4$ | Uniaxial | 887.2 | 3.3 | 5 | 5 | 11 | 3 | |
| Silicon | Isotropic | 523 | 4.6 | 4 | 148 | — | — | 1.1-6.6 |
| Diamond | Isotropic | 1332.5 | 2 | 15-20 | >1800 | 1.0 | 20 | 0.23-3, >6 |

Figure 1F:
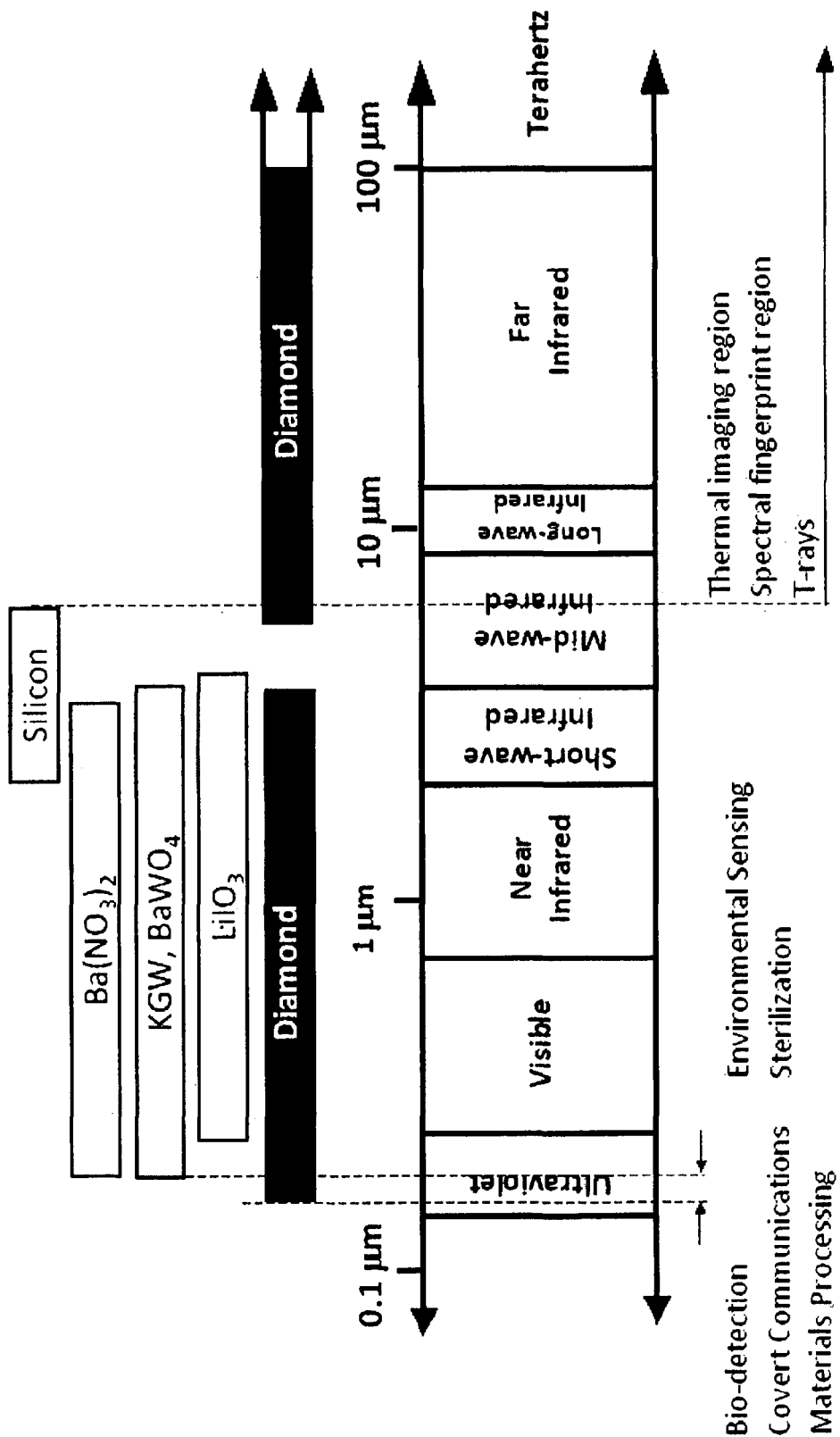
FIG. 1F shows a comparison of diamond transparency range with other representative Raman laser materials.

FIG. 1F shows a schematic representation of the transmission range of common solid state Raman materials compared with that of diamond. As can be seen, most other Raman materials are optically transparent only in the range of between about 0.35 to 5 μm. In contrast, diamond is also transparent at wavelengths longer than 6 μm. For wavelengths longer than 6 μm there is a paucity of alternative materials yet significant demand for laser sources for trace gas sensing, medical, security and defence, thus Raman lasers operating in this region would be widely applicable to many varied applications. There are significant challenges for long wavelength extension, however, due to the presence of diamond's multiphonon absorption band between about 3 and about 6 μm and also the diminishing Raman gain coefficient, g, which decreases as the wavelength increases (i.e. as the frequency, $\omega_s$, of the Stokes wavelength decreases).

The Raman linewidth of diamond, which is an indicator of the maximum line broadening introduced by Raman shifting, is at the low end compared to other materials but not as narrow as barium nitrate. For efficient operation of the diamond Raman laser, the pump radiation advantageously has a linewidth less than or about equal to the linewidth of the Raman gain of the Raman material. Diamond is isotropic for linear optical phenomena, which is often considered a disadvantage because of the susceptibility for stress-induced birefringence to depolarize transmitted radiation. Stress-induced birefringence often inherent in CVD-diamond can be problematic in terms of the laser threshold, therefore low-birefringence diamond is advantageous. Care should also be taken when mounting the diamond crystal without applying stresses to the crystal thereby to minimise stress-induced birefringence.

Figure 16:
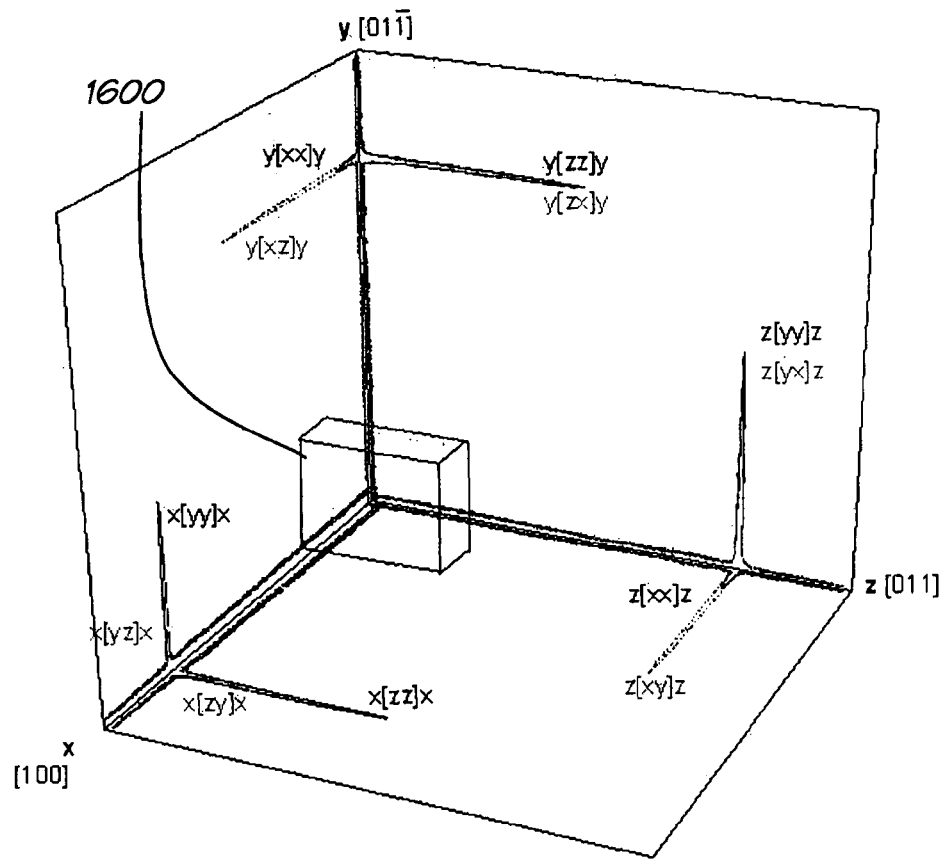
FIG. 16 a graph of backscattered polarized Raman spectra for a rectangular diamond crystal with {100} and {110} facets.

The orientation of the diamond crystal axis relative to the polarization of the pump laser may be such as to maximise the Raman gain. FIG. 16 shows a graph of the backscattered polarized Raman spectra for a rectangular diamond Raman laser crystal 1600 with {100} and {011} facets. From FIG. 16 it can be seen that the polarization of the Raman scattered radiation is parallel to the pump laser for the pump polarization in the {011} plane (e.g. the Brewster facets of the Raman material in the example of FIG. 4 discussed below are oriented so that the low-loss polarization was Raman-scattered with polarization parallel to the pump radiation). Also from FIG. 16 it can be seen that the polarization of the Raman scattered radiation is perpendicular to the pump laser for the pump polarization in the {100} plane. For pump polarization at intermediate angles the pump is scattered into a mixture of polarizations according to the third-order susceptibility tensor for diamond's crystal class [see Gardiner, D. J. et al, *Practical Raman Spectroscopy*, (Springer-Verlag, 1989) p. 24]. In practice, the diamond Raman material should be oriented with respect to the polarization of the pump radiation to access a higher effective Raman gain coefficient and thus for more efficient operation. Therefore, for optimisation of any of the diamond Raman laser arrangements disclosed herein, it may be advantageous to ensure that the pump beam is a polarised pump beam and that the polarisation of the pump beam is oriented such that it is parallel to the appropriate crystal axes for increased Raman gain. The crystal axes to which the polarisation of the input pump beam is made parallel to, may be the <100>, <110> or <111> axes of the diamond crystal lattice. Also, in the case of Brewster cut Raman crystal, it may be advantageous to ensure that the polarisation of the resultant Raman-converted Stokes light is also polarised in the same orientation as the pump light to enable simultaneous minimisation of reflection losses of the Stokes and pump light at the Brewster facets of the Raman material.

The laser damage threshold of diamond is also a crucial parameter, however, to date there is a lack of information available especially for the most recent material. Measurements on single crystal diamond suggest that the damage threshold is approximately 10 GW.cm$^{-2}$ for pulsed 1064 nm radiation of duration 1 ns, and is probably higher than many other Raman materials.

Modelling of Diamond Raman Lasers

Figure 2:
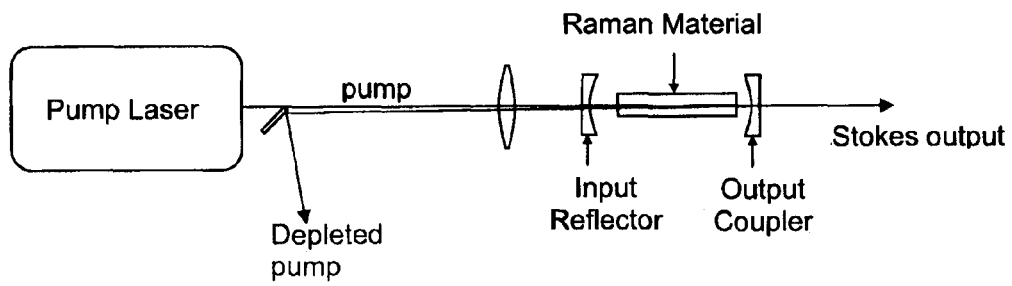
FIG. 2 is a schematic of the external cavity configuration used in the numerical model described herein.

To understand and predict the Raman processes in the solid state diamond Raman material, a numerical model has been developed to simulate the temporal dynamics of the pump and Stokes field in a basic external cavity configuration as shown in FIG. 2 (similar to external cavity Raman laser system 110 of FIG. 1A). The basic assumptions of the numerical model are that only plane wave interactions are considered and that the linewidth of the input pump beam is approximately less than or about equal to the Raman linewidth. The well known coupled equations for Raman conversion to the first Stokes are:

$$\frac{dI_p^\pm}{dz} = -g \cdot I_p^\pm \cdot I_s - \alpha_p \cdot I_p^\pm \quad (4)$$

$$\frac{dI_s^\pm}{dz} = g \cdot I_p \cdot I_s^\pm - \alpha_s \cdot I_s^\pm \quad (5)$$

where $I_{p,s}^+$ and $I_{p,s}^-$ are the forward and backward propagating pump, p, and Stokes waves, s, $I_{p,s}=I_{p,s}^- + I_{p,s}^+$, $\alpha_{s,p}$ is the material absorption (loss) coefficient and z is the longitudinal position in the cavity.

The model propagates the field using time steps dt=dz.n/c and the external resonator is modelled by propagating the pump and the Stokes fields through the crystal. Small air-spaces between the crystal and resonator mirrors are also considered. The input coupler and output coupler are adapted to resonate light at the Stokes wavelength and also to allow a double pass of the input pump laser to match common experimental conditions.

As will be appreciated, the accuracy of Raman laser models depends on the validity of the model assumptions and the input parameters. Experimental input parameters such as the pump pulse energy, pulse duration and pulse rate are well known parameters, whereas the beam brightness in the crystal slightly less so due to relatively large uncertainties in introduced by spot-area measurements. The input and output beams in the crystal are typically low order mode far-field profiles (of approximately Gaussian transverse profile) so the plane wave assumption of the present model will lead to some significant errors, however spectral overlap between the pump and Raman linewidth has been seen to be a good assumption to date for Nd-based pump lasers. Model accuracy, of course, also depends on a good knowledge of the material parameters including the gain coefficient, g, and also the absorption (loss) coefficient, $\alpha_{s,p}$.

Raman Gain Coefficient

Generally, the Raman gain coefficient for a material is given by the relation:

$$g_R = k \cdot \frac{\omega_S T_2}{\omega_R} \left(\frac{d\alpha}{dq}\right)^2 \quad (6)$$

where $T_2$ is the dephasing time, $d\alpha/dq$ is the derivative of the polarizability $\alpha$ as a function of displacement between vibrating centres, and $\omega_s$ and $\omega_r$ are respectively the frequency of the Stokes beam and characteristic frequency of the Raman vibrational mode (i.e. the characteristic Raman frequency of the Raman material) of the crystal lattice. The constant $k=4\pi N/(n_s \cdot n_p c^2 m)$ is a lumped constant where N is the number density of vibrating centres of reduced mass m, $n_s$ and $n_p$ are the refractive indices at the Stokes and pump frequencies respectively, and c is the speed of light in vacuo.

The strong wavelength dependence of the Raman gain coefficient that arises from the explicit appearance of the frequency $\omega_s$ of the Stokes beam in the gain equation and also some dependence of $d\alpha/dq$ on wavelength. Empirical studies in gases [see W. K. Bishel and M. J. Dyer, J. Opt. Soc. Am. B 3, 677 (1986)] suggest that the gain coefficient increases markedly for frequencies approaching the bandgap frequency $v_i$ according to the relation (referred to hereafter as the "Bishel formula"):

$$g(\omega_P) = \frac{D \cdot \omega_S}{(\omega_i^2 - \omega_P^2)^2} \quad (7)$$

where D is a fitting parameter.

Measurements of the Raman gain coefficient for diamond has only been reported on a few occasions dating back to the early 1970s and for only a few wavelengths. The early work was done in natural diamond while more recent measurements by Kaminskii [see. Kaminskii, A. A., et al "High-order Stokes and anti-Stokes Raman generation in CVD diamond," Phys. Status Solidi 242, R4-R6 (2005); and Kaminskii, A. A. et al, "High-order stimulated Raman scattering in CVD single crystal diamond," Laser Phys. Lett. 4, 350-353 (2007)] and in the last few years were performed using synthetic diamond grown using the CVD process. The crystal orientation was not reported in each case. Perhaps the most reliable indication of the remain gain coefficient, $g_R$, for diamond comes from comparison of the peak Raman cross-sections [see Basiev, T. T. et al Appl. Opt. 38, 594 (1999)], which suggests the steady-state Raman gain of diamond at 488 nm is several times 1.4 times barium nitrate and 4 times that of potassium gadolinium tungstate.

Figure 3:
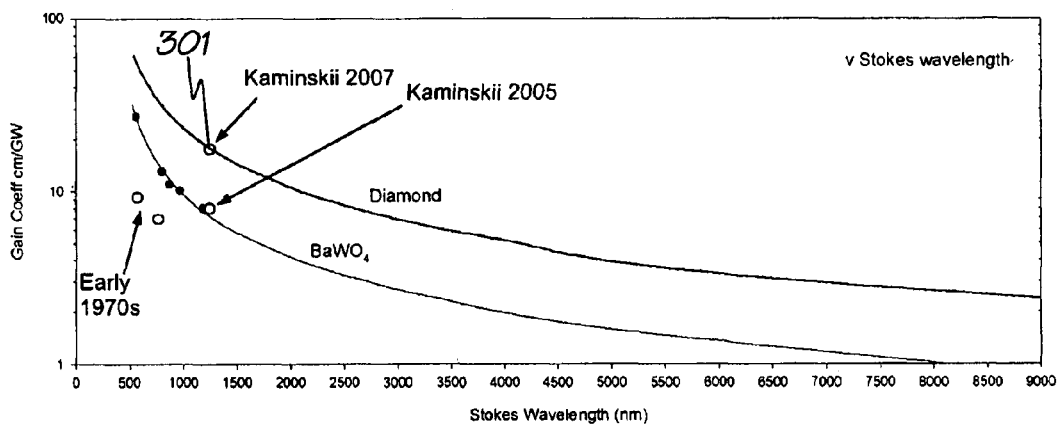
FIG. 3 shows a graph of the Raman gain coefficient as a function of first Stokes wavelength.

All measurements have used methods based on the observed threshold for SRS, and there is significant variation in the results as can be seen from the graph of the Raman gain coefficient as a function of first Stokes wavelength in FIG. 3, where open circles are measured data for diamond; and closed circles are measured data values for the alternate Raman material barium tungstate (BaWO$_4$). The solid lines of FIG. 3 are calculated using Equation 7 with the fitting parameter D chosen so that the calculations fit the Kaminskii 2007 data point 301.

Model Validation Example—Visible Diamond Raman Laser

To test and validate the numerical model, the modelling results were compared with experimental data from an example diamond Raman laser system pumped by a standard frequency doubled Nd:YAG laser at 532 nm (the first wavelength) which when Raman shifted by the CVD (low-birefringence single crystal) diamond Raman material to the first Stokes frequency produced an output beam at 573 nm (the second wavelength) using an external cavity arrangement.

Figure 4:
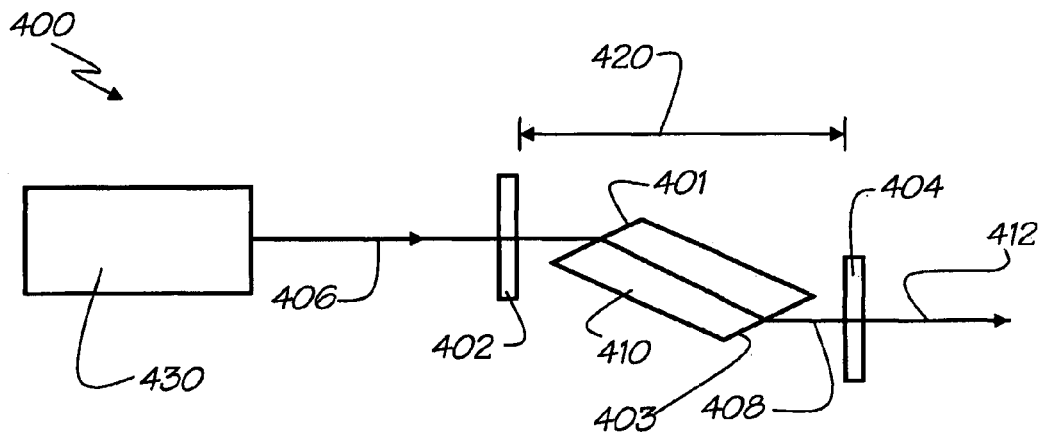
FIG. 4 is a schematic representation of an example visible diamond Raman laser used for validation of the numerical model.

FIG. 4 is a schematic representation of the visible diamond Raman laser system 400 used for validation of the numerical model outlined above. A parallelepiped diamond crystal 410 with Brewster facets 401 and 403 was cut to negate the effect of reflection losses from facets 401 and 403 for the laser system 400. In the present example, the diamond crystal 410 provided a path length (for light entering the crystal 410 at Brewster's angle through facet 401 and leaving through facet 403) of 6.7 mm. The diamond crystal had dimensions 6.7 mm long, 3.0 mm wide and 1.2 mm thick and was grown using methods to reduce birefringence in the material [see Friel, I. et al, Diamond and Related Materials, 18, 808-815, (2009)].

The diamond crystal 410 was mounted on a thermoelectric cooled mount (not shown) and placed inside an optical resonator cavity 420 comprising input reflector 402 and output coupler 404 as shown in FIG. 4. The resonator cavity 420 was designed such that the propagation direction of light through the diamond Raman material was parallel to the (110) direction of the crystal structure and perpendicular to the growth direction to minimize birefringence. The Brewster facets 401 and 403 of diamond crystal 410 were oriented so that the p-polarization is in the (110) plane and so that the scattered Stokes emission had a polarization which was parallel to the pump field in accordance with the third-order susceptibility tensor for diamond's crystal class.

Reflector 402 of the present example is an input coupler which was 94.2% transmissive (T) at 532 nm to transmit a pump beam 406 from pump source 430 and highly reflective (HR) at 560-650 nm to reflect light in the cavity 408 at the Stokes wavelength. The output coupler 404, which retro-reflects the pump beam 406 to provide a second pass of the Raman crystal 410, was HR at 532 nm, 20% T at 573 nm, and 80% T at 620 nm. Both resonator reflectors 402 and 404 in the present example had a radius of curvature of 20 cm. The reflectors 402 and 404 were placed adjacent to the diamond Raman crystal 410 so that the overall length of the resonator cavity 420 was about 10 to 12 mm. The calculated waist radius for the lowest-order resonator mode of this cavity 420 was about 85 µm.

The diamond Raman laser 400 was pumped using a pulsed pump beam 406 from one of two frequency doubled Q-switched Nd:YAG lasers (not shown), each with a pulse duration of 8 ns and pump wavelength of 532 nm. The first pump laser operated at 5 kHz pulse repetition frequency and generated up to approximately 2.2 W, corresponding to output pulse energies of up to 0.44 mJ of pump light. The second pump laser was used to investigate the performance at higher output energies using a 10 Hz pump laser (HyperYag, Lumonics, not shown). A harmonic separator (not shown) was placed on the output of each pump laser to ensure that the measurements of the Stokes output power from the system 400 were not affected by the presence of residual 1064 nm output from the pump sources. Both pump laser sources had a fundamental spatial mode output with measured beam quality factors less than 1.3. For the 5 kHz pump laser, the output beam was focused into the crystal using a 10 cm focal length lens (not shown) to provide a pump spot size approximately matching the fundamental mode radius of the resonator 420.

The pump light was converted to Raman shifted light in the output beam 412 at the first order Stokes wavelength of 573 nm (first Stokes light). The output power in the Stokes output beam 412 was measured using a calibrated (±3% accuracy) power meter (Newport 18-010-12) and pulse energies using an energy meter (ED100, Gentec). Pulse shapes of the Stokes output pulses of beam 412 were recorded using a fast photodiode and an oscilloscope combination with a response of 500 MHz. The spectral composition of the output beam 412 was measured using a grating spectrometer with a calibrated spectral response.

Figure 5:
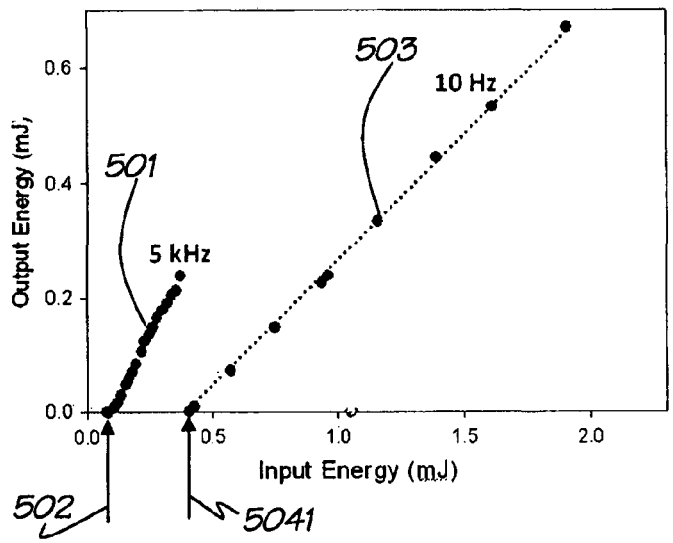
FIG. 5 is a graph of the output pulse energy for the visible diamond Raman laser of FIG. 4.

FIG. 5 shows the output energy 501 as a function of the pulse energy incident on the diamond crystal 410 (factoring an estimated loss of about 5.8% due to reflection losses from input coupler 401). The Raman laser threshold 502 for the 5 kHz pump laser was measured to be approximately 0.1 mJ of pump light 406. At greater pump powers, the Stokes output power increased linearly with a slope efficiency of about 74.9 (±2.0)% up to the maximum pulse energy of 0.24 mJ. The conversion efficiency at the maximum energy was 63.5(±1.0)%. A slight deviation above the linear fit is observed for input pulse energies of <0.23 mJ (slope in this range exceeds 80%), which is attributed to characteristic pulse shortening of the pump pulse (from approximately 10 to 8 ns) and the corresponding enhancement in the peak pump power as the input current is increased.

The output beam 412 largely consists of first Stokes light at 573 nm. A small amount of light at the second Stokes wavelength of 620 nm was observed in the output beam 412 at high input energies (above 0.28 mJ). At the maximum output pulse energy observed (0.44 mJ) approximately 10% was observed to be second Stokes light at 620 nm. In terms of the output power, the maximum combined first and second Stokes output powers was 1180 mW. Further investigation of the performance at higher input powers was limited by the capability of the pump laser.

Figure 6:
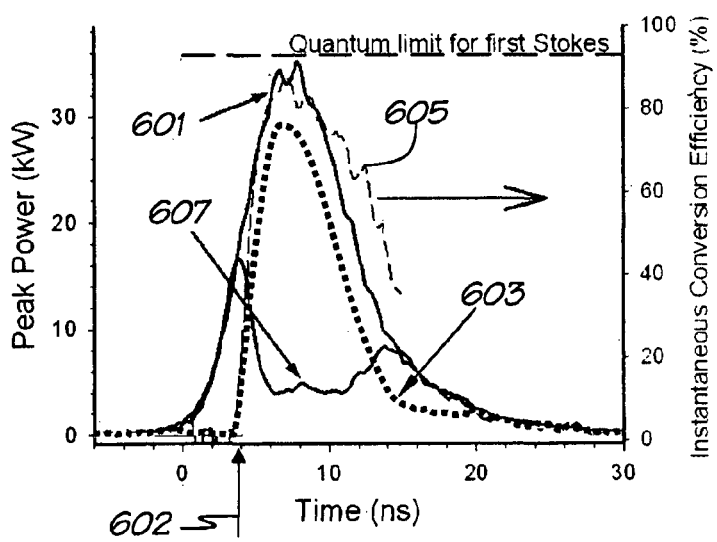
FIG. 6 is a graph of the pump, and Raman output pulses for the visible diamond Raman laser of FIG. 4.

Pulse shapes of the 5 kHz pump pulses (601) and the Stokes output pulses (603) were recorded in order to analyse the temporal behaviour of Stokes conversion and are shown in FIG. 6 where the pump and Stokes pulse shapes have been scaled using the measured input and output pulse energies to determine the instantaneous power and the conversion efficiency. The onset of Raman conversion of the pump occurred (602) when the power in pump pulse 601 had attained approximately 30% of its peak value, causing a lag from the leading edge of the pump pulse of 1-2 ns. The FWHM duration of the Stokes pulse 603 was measured to be about 6.5 ns, which is approximately 1.7 ns shorter than the pump pulse 601. The peak power of the Stokes pulse 603 was 29 kW. The instantaneous conversion efficiency 605 increased rapidly from zero to above 80% within 3 ns. The peak value of the Stokes pulse 603 is approximately 85% of the peak value of the pump pulse 601, which closely approaches the quantum efficiency for first Stokes ($\eta_{S1}$=92.8%). Indeed, the measured peak in the photon conversion efficiency 605 is 91%. After the peak, the conversion efficiency 605 decreases steadily to approximately 40% when the pump intensity decreases to ~30% of its peak value. At longer times (t>15 ns) values are not shown owing to evidence of a nonlinear detector response in this period and the resultant large errors as the signals approach zero.

FIG. 6 also shows the pulse shape 607 of the depleted pump beam after making the double pass of the resonator cavity 420 of Raman laser 400. The pulse shape 607 was obtained by sampling the retro-reflected pump beam from the Raman laser and scaling the signal so that the time integral is the energy difference between the pump and that lost by the Raman conversion (that is, (first Stokes pulse energy/$\eta_{S1}$)+(second Stokes pulse energy/$\eta_{S2}$)). The behaviour of the depleted pump pulse 607 prior to the onset of Stokes conversion (602) closely matches the pump pulse as expected. Once the threshold is attained (t>3.5 ns), a large depletion is evident by the rapid decrease in the transmitted pump pulse while the incident pump intensity is increasing. At the peak of the pulse when depletion is at its maximum (t~7 ns), the pump depletion is 88%, in good agreement with the peak photon conversion efficiency to the Stokes calculated above (91%). It is deduced that the balance between pump and output energy is accounted for by unconverted pump photons during all stages of the pump pulse (i.e., prior, during and after the Stokes pulse). Though there is measurable pump absorption (<1.1% cm$^{-1}$ at 532 nm as obtained by calorimetric measurements), the pulse shapes indicate it does not significantly impact the conversion efficiency under these conditions.

The 10 Hz pump laser was used to investigate the performance of the diamond Raman laser 400 at higher pulse energies. Using a pump focal spot radius of 100 μm, the conversion (42%) and the slope (64%) efficiencies were similar to that at 5 kHz. To scale the output energy further and to avoid damage to the dichroic coating on the input coupler, the pump waist size was increased to 200 μm to limit the incident fluence and thus minimise the possibility of damage to the diamond crystal. The Raman laser threshold energy (504 of FIG. 5) was 0.4 mJ and the output (503 of FIG. 5) scaled linearly (with a slope efficiency of 45%) to the maximum output energy of 0.67 mJ (with a peak power of ~80 kW). The maximum conversion efficiency was 35%. Higher conversion efficiencies are anticipated by using reduced curvature resonator mirrors to improve the spatial overlap between the pump and the resonator modes.

Figure 7:
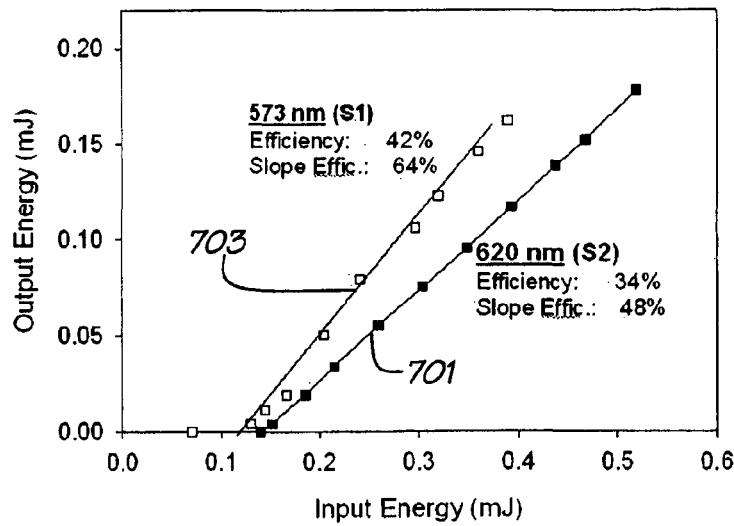
FIG. 7 is a graph showing a comparison of performance for output couplers selected for first and second Stokes output (10 Hz pump laser) for the visible diamond Raman laser of FIG. 4.

Preferential second Stokes output from the diamond Raman laser 400 was also observed using the 10 Hz pump laser by replacing the output coupler (404 of FIG. 4) with an output coupler which was high reflective (>99% reflective) for the 532 nm pump and 573 nm first Stokes light, and highly transmitting (about 40% transmitting) for the 620 nm second Stokes light. A comparison of performance of the first and second Stokes outputs (using output couplers suited for first and second Stokes generation) is shown in FIG. 7 demonstrating slightly lower efficiency for the 620 nm second-Stokes performance 701 (slope efficiency 48%) compared with that of the first Stokes output 703 (slope efficiency of 64% for similar conditions using a first Stokes output coupler).

Figure 8A:
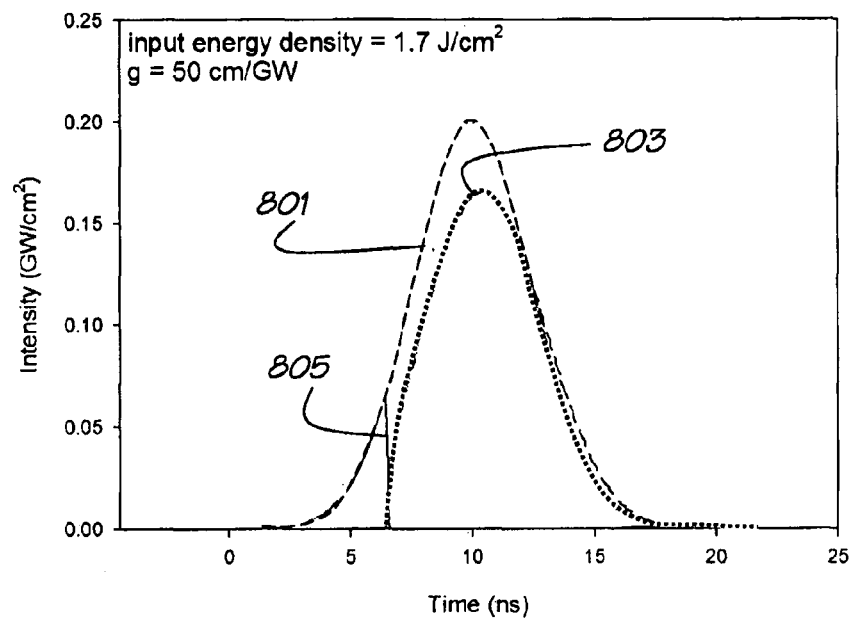
FIGS. 8A and 8B show respectively graphs of predicted (FIG. 8A) and observed (FIG. 8B—a reproduction of FIG. 6) pulse shapes for the input pump pulse, Raman converted output pulse and depleted pump pulse for the visible diamond Raman laser of FIG. 4.
Figure 8B:
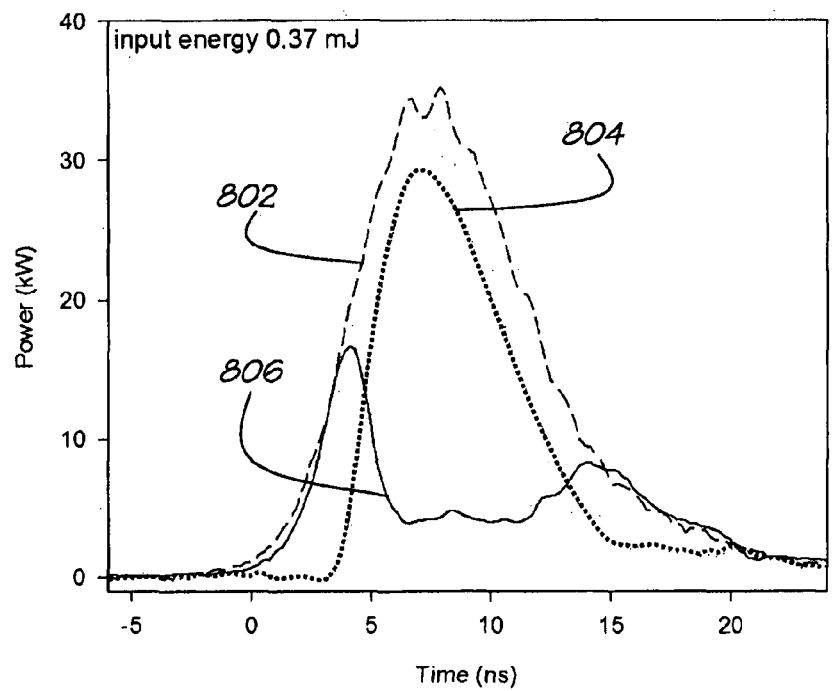

FIGS. 8A and 8B show respectively a comparison of pulse shapes for the above visible diamond Raman laser system 400 obtained using the numerical model described above (FIG. 8A) and the experimentally measured pulse shapes (FIG. 8B, which is a reproduction of FIG. 6 shown here again for ease of comparison). As noted above, the length of the diamond Raman laser material was 6.7 mm, the overall cavity length 11 mm, and the absorption coefficients at the pump and Stokes wavelengths of 532-nm and 573 nm respectively were about $\alpha_{p,s}$≈0.012 cm$^{-1}$. FIG. 8A shows the modelled pulse shapes of the pump (dashed line 801); Stokes (dotted line 803); and depleted pump—(solid line 805). Similarly, FIG. 8B shows the experimentally observed pulse shapes of the pump (dashed line 802); Stokes (dotted line 804); and depleted pump—(solid line 806). To calculate the input energy density to the model from the experimental pulse energy value, a pump spot radius of 80 μm was used.

It can be seen that many of the observed pulse features from the model validation of example system 400 are seen in the modelled results of FIG. 8A. The delay in the emergence of Stokes pulse in both the model (FIG. 8A) and the experimental data (FIGS. 6 and 8B) relative to the leading edge of the pump pulse is approximately 4 ns in each case. The time and amplitude of the peak Stokes output are also very similar. The most notable disagreements are seen on the falling edge of the modelled Stokes pulse. The depletion is much more complete in the model and the modelled Stokes intensity is higher. The modelled depleted pump pulse has a much lower baseline and the second peak late in the pulse is much smaller than seen experimentally. The difference is most likely due to the limits of validity of the plane wave assumption used in the model. More detailed analysis is required to understand the areas of disagreement, however, the qualitative agreement, particularly for the threshold lasing intensity, suggests that the model is likely to be useful to predict pump parameters for achieving lasing at other pump wavelengths.

The results using a diamond Raman material for visible output discussed above demonstrate that synthetic low-birefringence diamond is suitable for realizing highly efficient Raman lasers, and that key optical parameters such as absorption, scatter and depolarization are sufficiently low to enable efficient pulsed devices. Using a 532 nm pump beam with the diamond Raman material, the output laser wavelengths at 573 nm (first Stokes) and 620 nm (second Stokes)

may be useful in applications such as medical and biosensing. However, the value of the present demonstration is as a major step towards realizing diamond Raman laser systems that leverage the outstanding transparency range and thermal properties of diamond. Diamond is promising for accessing performance space not easily achieved using other Raman and non-Raman laser systems such as in high brightness lasers and lasers of wavelength in regions otherwise difficult to generate such as wavelengths greater than 5 micrometers.

As expected from the outstandingly high thermal conductivity of diamond, no evidence for thermal effects in the crystal was observed at the current output power levels. Much higher output powers are likely by using either higher pulse energies or repetition rates. It may be necessary to increase the beam waist diameter when increasing pulse energy to ensure the peak input power densities remain below the threshold for coating damage and for parasitic nonlinear effects such as self-focusing. On the simple basis of the diamond's high thermal conductivity, thermal lensing effects are not expected for Stokes powers approximately two orders of magnitude higher than other Raman materials. Given that current output powers for currently available external cavity Raman laser systems using Raman materials other than diamond are currently approaching 10 W, there is promise for diamond to scale to multi-hundred watt diamond Raman lasers without performance being impacted by thermal lensing (though the isotropic nature of diamond will require consideration of thermally induced stress birefringence).

It is useful to compare the performance of the visible diamond Raman laser described above, with a KGW Raman laser as described by the inventors in their related work [see R. P. Mildren, H. M. Pask, and J. A. Piper, in Advanced Solid-State Photonics, OSA Technical Digest Series (Optical Society of America, 2006), paper MC3], which represents state of the art in efficient external cavity Raman lasers and was operated under very similar conditions using identical pump laser sources and resonator mirrors. A summary of maximum output parameters from the diamond Raman laser system 400 of FIG. 4 when pumped using the 10 Hz and 5 kHz pump input sources is shown in Table 4.

TABLE 4

Comparison of Maximum Output Parameters from Diamond Raman Lasers pumped by 5 kHz and 10 Hz Sources, with a 5 kHz KGW Raman laser.

|  | 5 kHz | 10 Hz | KGW* |
| --- | --- | --- | --- |
| Input energy (mJ) | 0.373 | 1.91 | 0.47 |
| Output energy (mJ) | 0.237 | 0.67 | 0.3 |
| Conversion efficiency (%) | 63.5 | 35.1 | 64 |
| Slope efficiency (%) | 74.9 | 44.9 | 71 |
| Output power (mW) | 1180 | 6.7 | 1500 |

*R. P. Mildren, H. M. Pask, and J. A. Piper, in Advanced Solid-State Photonics, OSA Technical Digest Series (Optical Society of America, 2006), paper MC3

The major experimental differences of note are consequences of the diamond's shorter length (6.7 mm cf. 50 mm for KGW) and larger Stokes shift of $v_R=1332$ cm$^{-1}$ compared with a Stokes shift of only about $v_R=901$ cm$^{-1}$ in KGW. The much larger Stokes shift in diamond enables the diamond resonator length to be much shorter (12 mm compared to with a resonator length of about 55 mm for the KGW laser system) and the primary output wavelength of the diamond system to be the first Stokes where the transmission of the output coupler is 25% (compared with 70% for the 588 nm second Stokes for the KGW Raman laser). In spite these differences, the maximum conversion using diamond as the Raman material is almost identical (about 63.5% compared with about 64% for KGW) and the slope efficiency for diamond is marginally higher (about 74.9% compared with about 71% for KGW). The diamond Raman laser efficiency of about 74.9% is higher than that for all other reports of high efficiency nanosecond external cavity Raman lasers of which the inventors are presently aware.

The results from the example diamond Raman laser system discussed above demonstrate that synthetic low birefringence solid state diamond crystals are suitable for realizing highly efficient Raman lasers and indeed appear to be at least as efficient as that reported for other Raman crystals. Given the high photon conversion efficiency observed (>90%) in the diamond Raman laser, it is expected that the combined loss from processes such as absorption, elastic scatter, and depolarization is minor.

In the example visible diamond Raman laser setup described above, it was also possible to determine the crystal absorption and birefringence. An upper bound on the absorption was determined by measuring the power pumped by the thermoelectric cooler with the resonator misaligned to prevent lasing. The power deposited in the crystal at 2 W input power was 16 mW, which corresponds to an absorption coefficient of less than $0.012\pm0.001$ cm$^{-1}$. This value, which is notably higher than for similar single crystal material (although not low birefringence) made by the same manufacturer (0.0026 cm$^{-1}$), is an upper bound owing to the added thermal contribution from the scattered light from the crystal impinging on the cooling mount. Fluorescence from the diamond crystal at wavelengths of 580-700 nm was visible, consistent with some absorption by color centers such as the well known nitrogen vacancy center N-V$^-$. The average birefringence $\delta n$ along the beam path is found by measuring s-polarized external reflection from the exit facet, which is proportional to the depolarization induced by a single pass of the crystal. The facet reflection was $0.10(\pm0.02)\%$ of the incident pump, which corresponds to $\delta n=1.0(\pm0.2)\times10^{-6}$. This value is similar to that previously reported for similar low-birefringence material ($\delta n=5\times10^{-7}$).

The maximum output power achieved (1.2 W) with the visible diamond Raman laser system 400 in the example above was limited by the pump laser power available from the pump sources used in the example. No evidence for thermal effects in the crystal were observed, which is expected from experience in KGW Raman laser systems as well as the very high thermal conductivity of diamond. Much higher output powers are likely to be achieved by using higher power pump lasers and by increasing the beam waist diameter to ensure that the peak input power densities remain below the threshold for coating damage and for parasitic nonlinear effects such as self-focusing. Owing to diamond's high Raman gain, broad transparency, and high damage threshold, there is therefore substantial promise for efficient and high power Raman lasers of small size and broad wavelength range.

Modelling of Mid- to Far Infrared Diamond Raman Lasers

The numerical model outlined above can be used to predict the input pump requirements in order to achieve laser threshold in a mid- to far infrared diamond Raman lasers.

Figure 14:
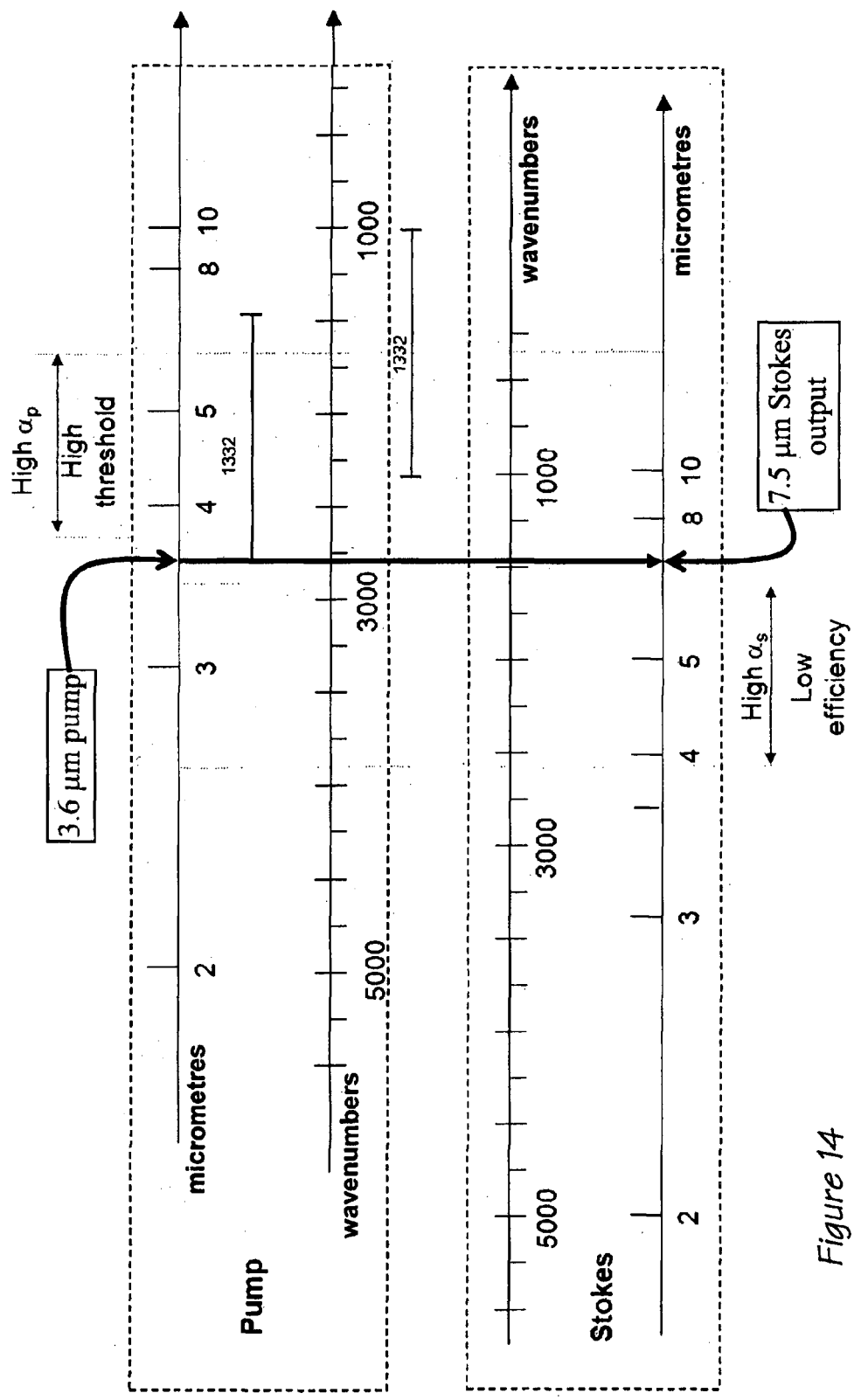
FIG. 14 is a schematic representation of the wavelength zones corresponding to low efficiency and high threshold for diamond Raman laser systems obtained from the numerical model described herein.

As can be seen from FIG. 14, threshold and efficiency are constrained by the two-phonon band in diamond ($\alpha>1$ cm$^{-1}$) which absorbs strongly in the range of about 3.8-6.0 µm (i.e., 1650-2650 cm$^{-1}$). Due to the large characteristic Raman shift of diamond of $v_R=1332$ nm, it is possible to pump the diamond Raman laser system on the short wavelength side of the absorption band (pump wavelength of less than about 3.8 µm), and with Stokes output on the long wavelength side (greater than about 5.5 µm). For pump wavelengths longer than 3.8 µm, the strong absorption of the pump is an important consideration, particularly in the 4 to 5.5 micrometer range, and absorption of the first Stokes wavelength also needs to be considered for pump wavelengths shorter than 3.2 µm, although this may be alleviated by cooling the diamond Raman material to minimize the probability of multiphonon absorption such that pumping the diamond Raman laser system with wavelengths in the range of between about 3 µm to about 7.5 µm is possible. Best performance is expected for pump wavelengths in the range of between about 3.2 and about 3.8 micrometers. As mentioned above, isotopically pure diamond crystals may also be advantageous in minimising unwanted absorption.

For the following modelling discussion, a first Stokes shifted output wavelength of about 7.5 µm (1430 $cm^{-1}$) is used corresponding to an input pump wavelength of 3.6 µm (2760 $cm^{-1}$) to coincide with favourable low values of the absorption coefficient $\alpha_{s,p}$ of diamond at these wavelengths, i.e. around the multiphonon absorption band [see FIG. 6 of Thomas, M. E. & Joseph, R. I., Optical phonon characteristics of diamond, beryllia, and cubic zirconia Proc. SPIE, Vol. 1326, 120 (1990); doi:10.1117/12.22490; and FIG. 3.5 of Wilks, E. & Wilks, J., Properties and Applications of Diamond Paperback: 525 pages Publisher: Butterworth-Heinemann (Apr. 15, 1994) ISBN-10: 07506191] of single-crystal solid state diamond crystals.

Considering the Kaminskii 2007 data point (301 of FIG. 3), the relative measurements of Basiev et al [see Basiev, T. T. et al Appl. Opt. 38, 594 (1999)] and the modelling results for visible diamond Raman laser systems as discussed above, the Raman gain coefficient of single-crystal solid state diamond crystals at 532 nm is estimated to be in the vicinity of about 45 (±~15) cm/GW. Assuming the Bishel formula of Equation 7 above is valid, the gain extrapolated to a Stokes wavelength of 7.5 µm is about 2 cm/GW. Note, however, that the Bishel formula (Equation 7) may not be accurate for the diamond Raman material at long wave infrared wavelengths due to perturbations arising from the diamond multiphonon absorption feature extending between about 3 to 5 µm. The input parameters to the numerical model for a diamond Raman laser used in the present examples are shown in Table 5, where it has been assumed that the pump linewidth is similar or smaller than the Raman linewidth of diamond (half-width typically about 1.6 $cm^{-1}$ although may be larger depending on common line broadening mechanisms).

TABLE 5

Example Numerical Model Input Parameters for Diamond Raman Laser with 7.5 µm Output

| | |
|---|---|
| Raman gain coeff., $g_R$ ($\lambda_s$ = 7.5 µm) | 2 cm/GW |
| Pump Wavelength, $\nu_p$ | 2760 $cm^{-1}$ (3.6 µm) |
| First Stokes output wavelength, $\nu_s$ | 1430 $cm^{-1}$ (7.5 µm) |
| Abs. coeff. at pump, $\alpha_p$ | 0.4-1.2 $cm^{-1}$ * |
| Abs. coeff. at Stokes, $\alpha_s$ | 0.1-0.3 $cm^{-1}$ * |
| Crystal length | 8 mm |
| Output coupler transmission/ reflectivity at Stokes | 20% T, 80% R |

* Range determined using values taken from Wilks & Wilks and Thomas et al

Figure 9:
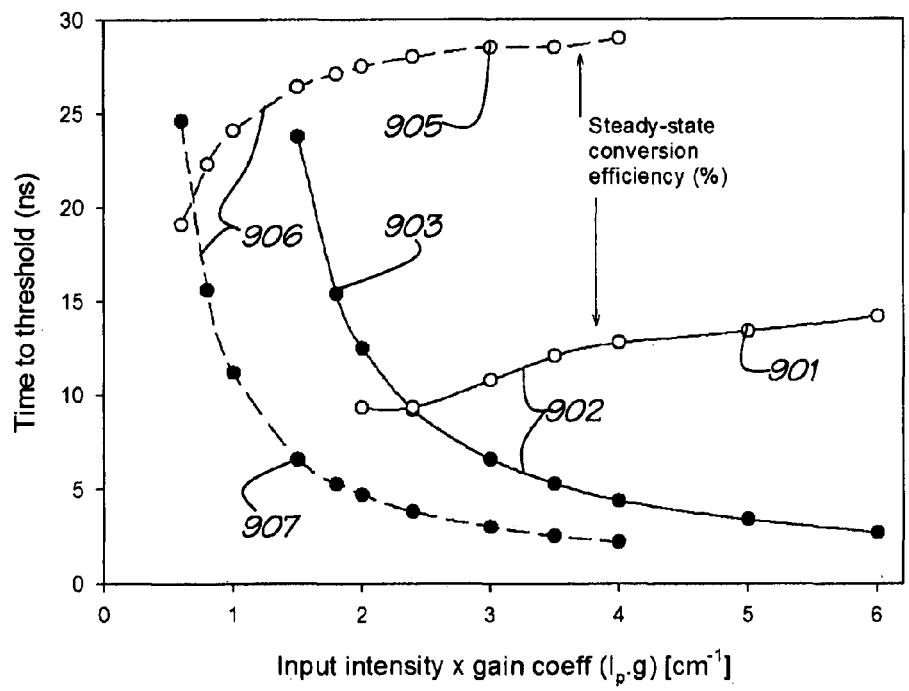
FIG. 9 shows the predicted times (filled circles) in nanoseconds for the diamond Raman material to reach threshold and commence generation of the 7.5 µm first Stokes light as a function of the intensity of a 3.6 µm pump input field and the steady-state conversion efficiency is also shown (open circles 903 and 907) (two sets of model results are presented for the Thomas (solid curves 902) and Wilks (dashed curves 906) absorption data)
Figure 10:
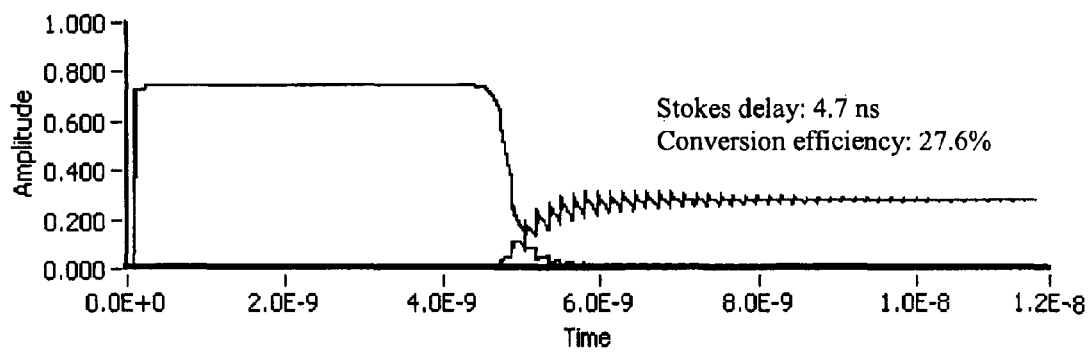
FIG. 10 shows a graph of the output from the numerical simulation model of a 7.5 µm diamond Raman laser for input parameters g.I$_p$=2 cm$^{-1}$. $\alpha_p$=0.4 cm$^{-1}$ and $\alpha_s$=0.1 cm$^{-1}$.

There are two important considerations in order to reach laser threshold. Sufficient pump intensity is required to generate a gain in the Raman material that exceeds the round-trip losses. Also, the pump light needs to be present for a sufficient duration to enable the build up of a Stokes beam that is sufficiently intense to substantially deplete the pump beam. FIG. 9 shows the predicted times (filled circles 901 and 905) in nanoseconds for the diamond Raman laser to reach threshold and commence generation of the 7.5 µm first Stokes light as a function of the intensity of the 3.6 µm pump input field, expressed in terms of the product of the pump intensity and the gain coefficient, ($I_p$.g) [$cm^{-1}$]. The steady-state conversion efficiency is also shown (open circles 903 and 907). This model calculation uses a step function laser pulse which are not generally comparable to experiment (an example of the raw model output is given in FIG. 10). However, the results give a good indication of pump power and pulse duration requirements needed to threshold and achieve efficient conversion. Two sets of model results are presented for the Thomas (solid curves 902) and Wilks (dashed curves 906) absorption data respectively. The steady-state efficiencies are notably less than the quantum efficiency (48%) due to absorption loss of the pump and Stokes in the diamond.

The model results in FIG. 9 predict that for pulses of the order of 10 ns, pump intensities of at least 1 $GW/cm^2$ are required for the example input parameters used. For the absorption coefficients obtained from the Thomas reference (above), lasing threshold is never reached for pump pulses <1 $GW/cm^2$ as round-trip absorption loss is larger than the gain. For the absorption coefficients obtained from the Wilks reference (above), the threshold decreases to ~0.3 $GW/cm^2$.

Figure 11A:
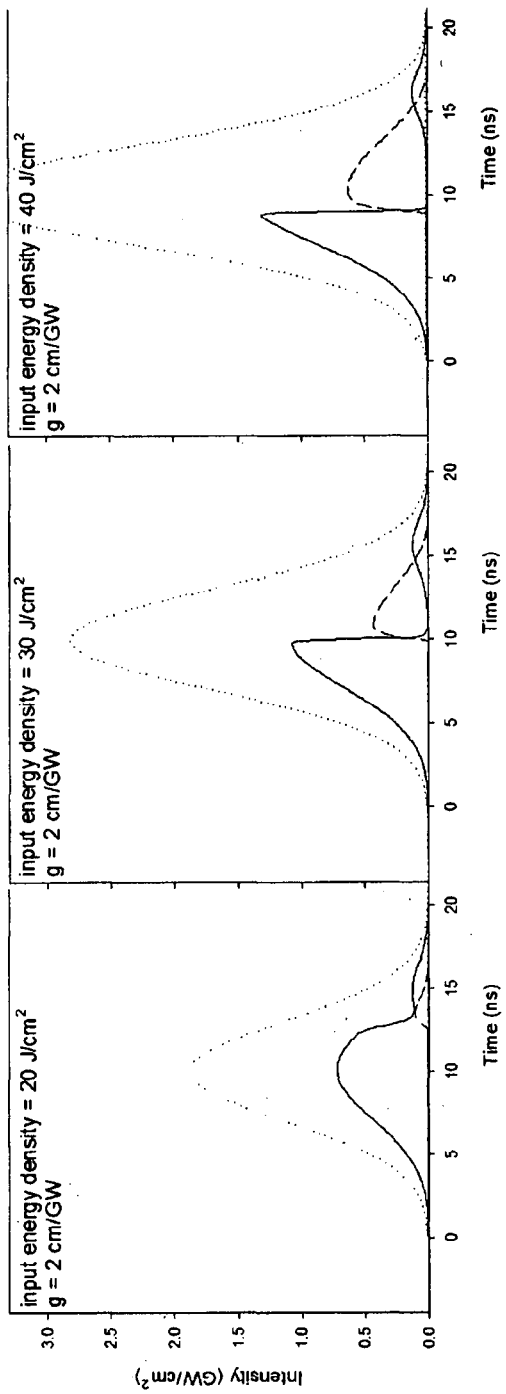
FIG. 11A shows a sequence of graphs similar to FIG. 8A showing numerically modelled pulse shapes for increasing input energy density, considering the absorption coefficient data of Thomas [FIG. 6 of Thomas, M. E. & Joseph, R. I., Optical phonon characteristics of diamond, beryllia, and cubic zirconia Proc. SPIE, Vol. 1326, 120 (1990); doi: 10.1117/12.22490]
Figure 11B:
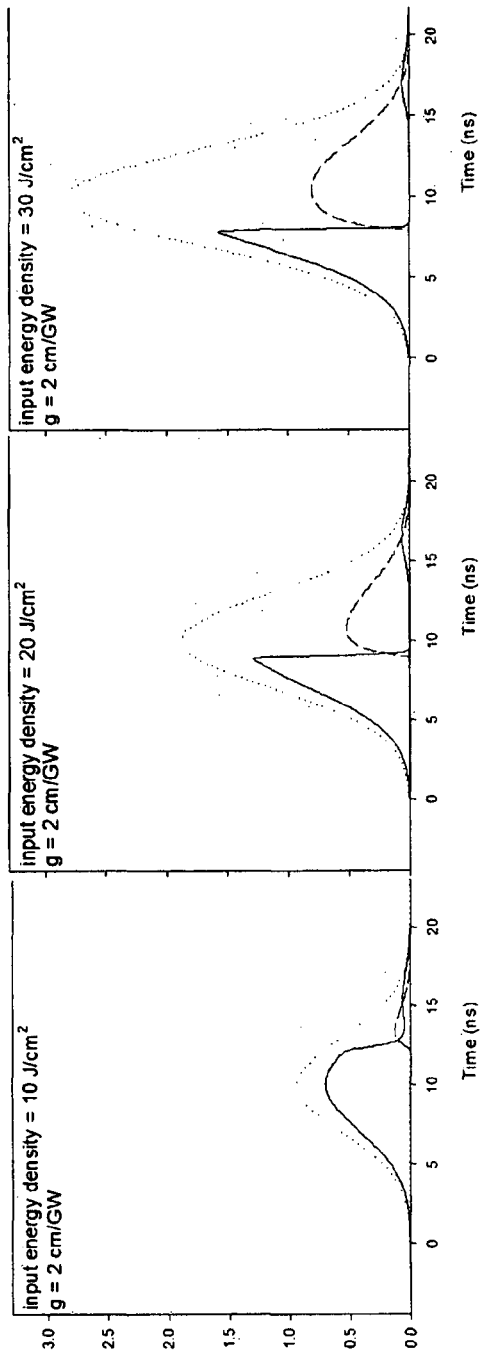
FIG. 11B shows a sequence of graphs similar to FIG. 8A showing numerically modelled pulse shapes for increasing input energy density, considering the absorption coefficient data of Wilks [FIG. 3.5 of Wilks, E. & Wilks, J., Properties and Applications of Diamond Paperback: 525 pages Publisher: Butterworth-Heinemann (Apr. 15, 1994) ISBN-10: 07506191]

The numerical model was next used to calculate the temporal laser performance for several pump intensities for 3.6 µm laser pump pulses of 10 ns FWHM as shown in FIGS. 11A and 11B using the absorption values obtained from the Thomas and Wilks references respectively. The numerical results using the Wilks absorption coefficients (FIG. 11B) indicate that the diamond Raman laser threshold is about 10 $J/cm^2$ whereas it is approximately double for the higher Thomas absorption values (FIG. 11B). The major fraction of the pulse is converted to Stokes for input energy densities greater than approximately 30 $J/cm^2$. For a nominal pump spot size of 60 µm, the corresponding pump pulse energies needed are shown in Table 6. To ensure that the pump intensity is maintained across the entire crystal length the Rayleigh range in the material should be greater than or approximately equal to about 5 mm and the input beam quality less than or approximately equal to $M^2$=1.5.

TABLE 6

Energy required to reach Raman threshold generating 7.5 µm Raman output using 3.6 µm pump and a 60 µm spot in the diamond crystal..

| Energy Density $J/cm^{-2}$ | Intensity $GW/cm^{-2}$ | Pulse energy mJ |
|---|---|---|
| 10 | 1 | 1.1 |
| 20 | 2 | 2.3 |
| 30 | 3 | 3.4 |
| 40 | 4 | 4.5 |

The plane wave approximation in the model assumes good mode overlap between the pump and Stokes fields in the diamond Raman material. In practice, this may be readily achieved for an external resonator configuration since the pump waist size can be controlled independent of the waist size of the resonated Stokes field. The pump mode size as it passes through the Raman material is determined by the beam properties of the pump laser and the beam optics that relay the beam into the Raman material. For example, reducing the focal length or moving the position of the focusing lens or imaging telescope can increase the pump spot in the Raman crystal. On the other hand, the mode size of the Stokes field is primarily determined by the lensing properties of the resonator mirrors. In general, good conversion efficiency may be maintained provided that the pump mode size is approximately equal to or fractionally less than the resonator (Stokes) mode size, for example about 0.5 to 1.1 times the Stokes mode size (e.g. about 0.50 times, or 0.55, 0.60, 0.65, 0.70, 0.75, 0.80, 0.85, 0.90, 0.95, 1.00, 1.05, or about 1.10 times the resonator mode size), where the pump mode radius is a minimum in the Raman material.

According to basic theory, all other parameters being constant, the mode size scales (increases) proportionately with the wavelength (i.e. of the Raman-shifted wavelength resonating in the resonator of the Raman laser system). Thus, for a tunable Raman laser system, it may be an advantage to adjust the spacing of the optical elements, for example the spacing of lenses in a beam telescope, while tuning the laser in order to maintain conversion and output efficiency. That is, the beam size of the pump beam may be simultaneously tuned when the pump wavelength is tuned, to maintain the mode-matching conditions between the size of the pump beam in the Raman material and the resonator mode for the Raman-converted wavelength. This may particularly important when tuning to longer pump wavelengths as the Stokes wavelength increases at much greater rate as the pump wavelength increases. Mode-matching principles are well known in the art for both external cavity and intracavity Raman lasers, and may be applied as required to the diamond Raman laser systems disclosed herein.

It is seen above that the modelled laser pump threshold and output efficiency varies significantly when using different absorption coefficients. It is important to understand how the threshold and efficiency vary as functions of the absorption coefficients at the pump and Stokes wavelengths ($\alpha_p$ and $\alpha_s$ respectively) to enable prediction of performance when using diamond of various impurities and when changing the operating wavelength(s). It is also important for understanding how the present uncertainties in the absorption values affect the model.

To explore these issues, the numerical model was used to calculate how the required pump intensity needed to reach threshold varies as a function of $\alpha_p$ and $\alpha_s$. A step function pump pulse was used and the pump intensity was varied until the Raman laser output exceeded threshold at a fixed time of t=10 ns. The steady state conversion efficiency (i.e., for t→∞) was also recorded. Though again, direct comparison with experiment is not really feasible, this approach allows the trends in threshold and efficiency to be investigated. The efficiency values are thus maximum peak values achievable using more realistic (e.g., Gaussian) temporal pump pulse profiles.

Figure 12:
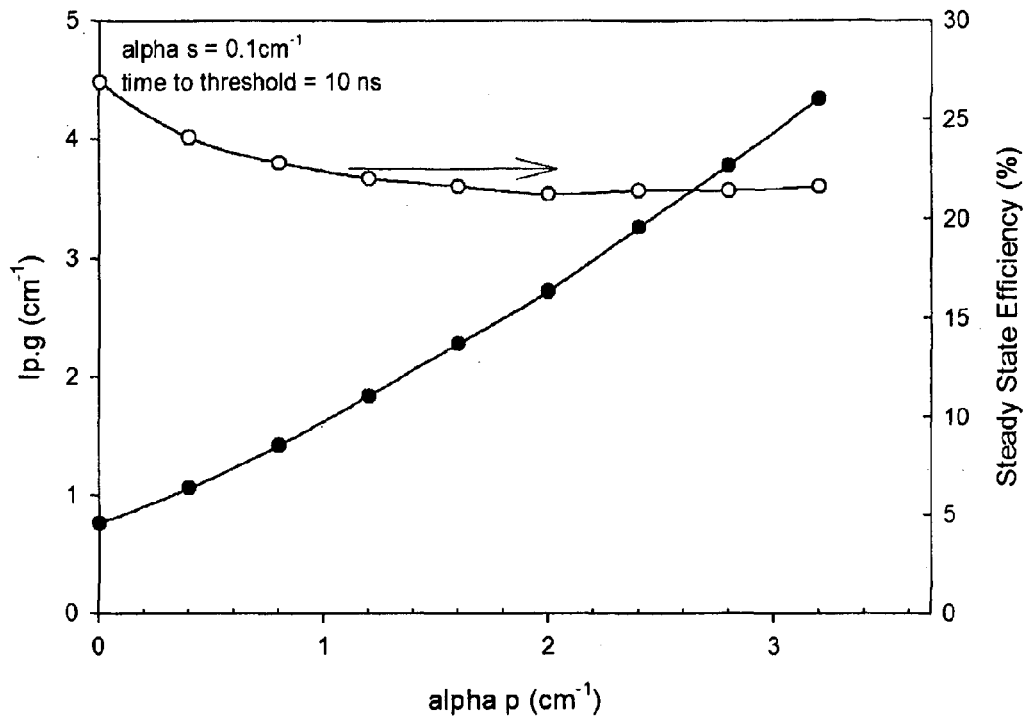
FIG. 12 shows a graph of numerically modelled threshold I$_p$.g of a diamond Raman laser generating output at 7.5 µm as a function of the absorption coefficient, $\alpha_p$, of the pump wavelength at 3.6 µm, considering a step function pump pulse and a time-to-threshold of 10 ns.
Figure 13:
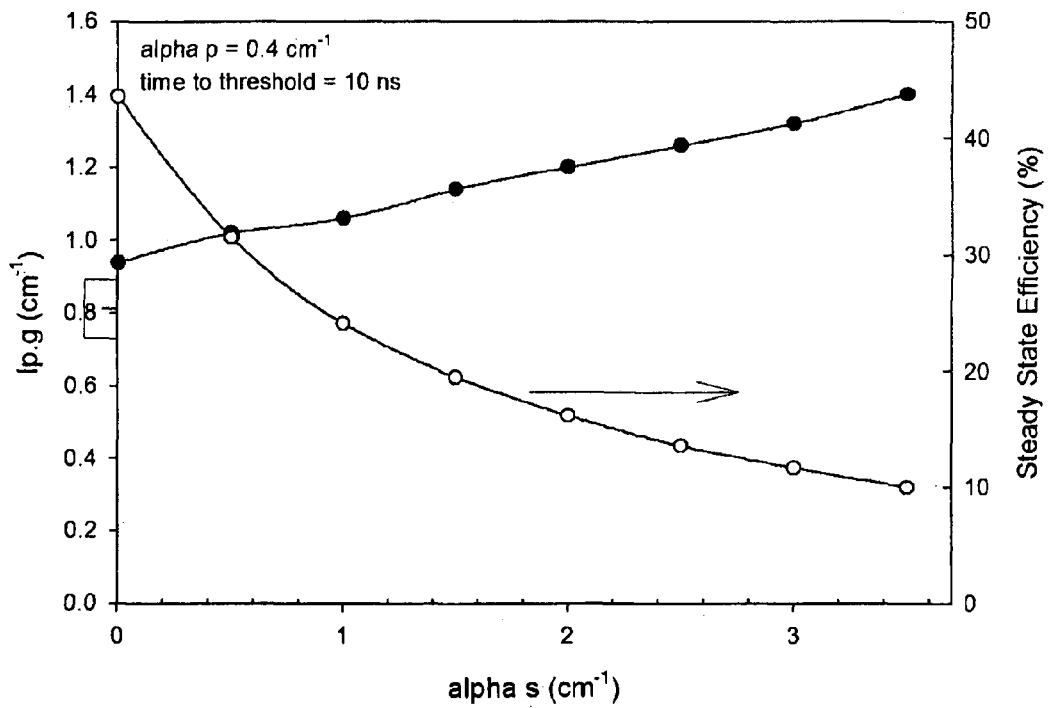
FIG. 13 shows a graph of numerically modelled threshold I$_p$.g of a diamond Raman laser generating output at 7.5 µm (pump wavelength 3.6 µm) as a function of the absorption coefficient, $\alpha_s$, of the Stokes output wavelength at 7.5 µm, considering a step function pump pulse and a time-to-threshold of 10 ns.

As shown in FIG. 12, the threshold $I_p \cdot g$ increases slightly more than linearly as $\alpha_p$ is increased. This is not surprising given that the higher absorption directly reduces the $I_p \cdot g$ integrated over the length of the crystal. The steady state efficiency decreases slightly over the investigated range but is clearly not a strong function of $\alpha_p$. On the other hand, when increasing $\alpha_s$, the major effect is a decrease in efficiency while the threshold only varies weakly (see FIG. 13). These results suggest that, to first order, operation at higher values of the absorption coefficient at the pump wavelength, $\alpha_p$, can be compensated for by using proportionally higher pump intensities. For operation at higher absorption coefficients at the Stokes wavelength, $\alpha_s$, the threshold remains approximately the same but with lower achievable conversion efficiency.

Some qualitative statements about the likely performance as a function of wavelength can now be made. Since $\alpha_p$ is only large (>2 cm$^{-1}$) for pump frequencies 1700-2650 cm$^{-1}$, major increases in the threshold are likely to be expected in this range. In principle, Raman laser operation is possible in this range using proportionally larger pump intensities provided that the threshold for damage to the crystal is not exceeded. It may be an advantage to use shorter diamond crystals under these high absorption conditions. For operation at Stokes frequencies in the range $v_s$=1700-2600 cm$^{-1}$, (about 3.8 μm to about 5.8 μm), the high absorption coefficient of diamond in this frequency range restricts the maximum conversion efficiency below 10%. Note that such low conversions may still be adequate for many applications. Good maximum efficiencies (>10%) are predicted for wavelengths >5.5 μm ($v_s$>1800 cm$^{-1}$). These conclusions are highlighted as a function of wavelength and wavenumber in FIG. 14.

Multi-order Stokes generation enables the diamond Raman laser to increase the shift from the wavelength of the pump laser. For example, second Stokes generation provides a method to step the output wavelength two times the diamond Raman shift (2665 cm$^{-1}$) and is relevant for pump wavelengths shorter than 3.75 μm. In principle, this allows very long wavelength sources to be based on mid-IR pump lasers. In external resonators, methods for concentrating output at the second Stokes have been reported previously [see Mildren, R. P et al, "Efficient, all-solid-state, Raman laser in the yellow, orange and red", Opt. Express, vol. 12, pp 785-790 (2004)], though it should also be noted that the measures to prevent energy loss by cascading to the 3rd order are not necessary in the present case unless the pump wavelength is shorter than 2.5 μm.

In the multi-order Stokes generation of long wavelengths, the dependence of Raman gain with Stokes wavelength and four wave mixing between the pump and low order Stokes fields may need to be considered to determine the threshold. It should also be noted that although photon conversion efficiencies may be very high, a conversion efficiency based on power or energy may be quite low for multi-order Stokes conversion due to the large energy deducted from each pump photon.

The numerical model discussed above provides predictions for an external cavity diamond Raman laser with many fixed parameters including pump wavelength, crystal length, crystal absorption characteristics, pump pulse duration and output coupler value. These parameters are chosen based on brief and non-rigorous studies into parameters, which provide the lowest pump energies needed to achieve threshold. Although a rigorous optimization would require a detailed and lengthy analysis, it is useful to provide a qualitative discussion of the effects of key parameters to assist in selection of design parameters (including pump laser, crystal material and resonator designs), as seen in Table 7 below:

TABLE 7

The effects of varying key parameters in the numerical model

| Parameter | Effect of increase | Effect of decrease |
|---|---|---|
| Crystal length | Higher pump and Stokes absorption Lower efficiency | Reduced single pass gain Higher threshold |

TABLE 7-continued

The effects of varying key parameters in the numerical model

| Parameter | Effect of increase | Effect of decrease |
|---|---|---|
| Pump Wavelength | Higher pump absorption Higher threshold | High Stokes absorption Reduced conversion efficiency |
| Pump duration | Reduced threshold intensity Higher pump energies needed | Higher threshold intensity needed |
| Output coupling | Slightly increased threshold Higher conversion efficiency | Reduced threshold Lower conversion efficiency |
| Stokes absorption (or scatter) | (Slightly) increased threshold Reduced conversion efficiency | (Slightly) reduced threshold Increased conversion efficiency |
| Pump absorption (or scatter) | (Greatly) increased threshold | (Greatly) reduced threshold |

The numerical modelling of mid- to far-infrared diamond Raman laser systems indicates that a practical laser system for generating light greater than about 5.5 micrometers (typically in the range of between about 5.5 and about 8 micrometers) is feasible using a pump source generating pump radiation in the range of between about 3.2 to about 3.8 micrometers. The numerical modelling also suggests that a pump wavelength for the diamond Raman material in the range of between about 3 and about 7.5 micrometers is also feasible.

Due to the multiphonon absorption transition, the Raman threshold of the laser system increases in the region between about 4 and 5.5 micrometers, however modelling suggests that this may be overcome with sufficient pump intensities and or arrangements. For example, in a side-pumped Raman laser system, the absorption of the pump radiation is minimised due to the short penetration depths required, rather than in an end-pumped arrangement.

Diamond Raman Laser Pump Sources

Suitable pump sources for pumping the mid- to far-infrared diamond Raman laser systems may include solid-state lasers, optical parametric oscillators, fibre lasers, color center lasers, etc, [for a review of potential laser sources in the 3 to 4 micrometer range, see Sorokina, I. T., Crystalline mid-infrared lasers; in Solid-State Mid-Infrared Laser Sources, Topics in Applied Physics, Springer Berlin/Heidelberg Volume 89 2003 DOI 10.1007/3-540-36491-9_7 Pages 255-351].

Optical Parametric Pump Sources

Potential candidates for high peak power pulsed pump lasers include optical parametric oscillators. KTA [see for example Rui Fen Wu, et al, "Multiwatt mid-IR output from a Nd:YALO laser pumped intracavity KTA OPO" Optics Express, Vol. 8, Issue 13, pp. 694-698]) and $LiNbO_3$ (see for example Hideki Ishizuki and Takunori Taira, "High-energy quasi-phase-matched optical parametric oscillation in a periodically poled $MgO:LiNbO_3$ device with a 5 mm×5 mm aperture," Opt. Lett. 30, 2918-2920 (2005)] are robust materials with proven capability for significant energies and powers. Optical parametric oscillators provide good access to the pump wavelengths of interest (eg., about 3 to 7.5 micrometers) and can be used to provide tunable diamond Raman laser output by tuning the pump wavelength. Such optical parametric oscillator systems may comprise additional stages, for example amplifier stages to ensure the peak power of the pulsed pump radiation is sufficient to obtain threshold for the diamond Raman laser system. Examples of such amplifier stages may include an optical parametric amplifier.

Based on the model predictions above, a suitable optical parametric oscillator (OPO) pump source needs to satisfy requirements for wavelength (between about 3 and 7.5 μm), pulse energy (between about 1 mJ and about 10 J, pulse duration (between about 1 and 100 ns), linewidth (approximately less than or equal to about 2 $cm^{-1}$) and beam quality (brightness). Although OPOs in the 3 to 7.5 μm range are readily available for applications such as gas sensing and defence countermeasures, the performance of published and available systems do not simultaneously fulfill all these requirements. Nevertheless, the methods and techniques for developing OPOs with the required properties are well established and understood to those skilled in the art. There are also many configurations of the OPO that are likely to be able to satisfy the requirements.

Figure 17:
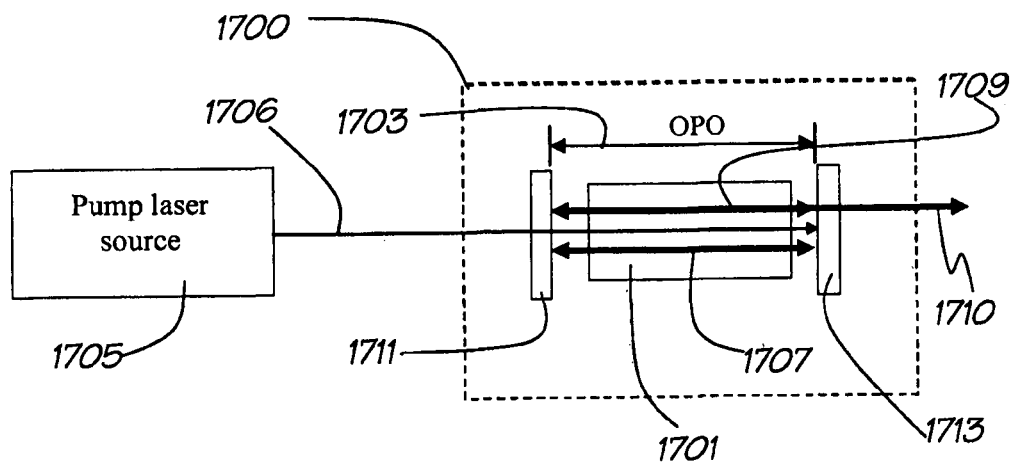
FIG. 17 is a schematic arrangement of an OPO pump source for the diamond Raman laser system.

In its most basic form, as depicted schematically in FIG. 17, the OPO 1700 comprises a nonlinear crystal 1701 with a high chi-2 ($\chi^2$) nonlinearity placed inside a resonator cavity 1703 and pumped by a pump laser 1705 generating a pump beam 1706 having frequency $\omega_p$. The OPO 1700 generates two beams referred to as the signal beam 1707 having frequency $\omega_s$ and idler beam 1709 having frequency $\omega_i$, where the idler has the longer wavelength and where the phase-matching condition $\omega_p=\omega_s+\omega_i$ is satisfied. The resonator 1703 may be either singly-resonant whereby the resonator reflectors 1711 and 1713 are adapted to resonate one of either the signal 1707 or the idler 1709 beam's, such that the non-resonant beam is emitted from the OPO. 1700 as an output beam 1710, or alternatively, the resonator may be doubly-resonant whereby the resonator reflectors 1711 and 1713 are adapted to resonate both the signal 1707 and the idler 1709 beams, and where the output reflector 1713 is adapted to be partially transmissive at the frequency of either the signal or the idler beam such that the transmitted portion of the resonating beam is emitted from the OPO 1700 as an output beam 1710. For output wavelengths in the range 3-5 microns, the desired output beam will be the idler beam 1709 when using pump lasers 1705 having a wavelength near 1 μm (for example a Nd:YAG laser source with wavelength 1.064 μm. In both cases, input reflector 1711 should transmit the pump beam 1706 into resonator 1703 to pump the nonlinear crystal 1701.

Example nonlinear materials 1701 include robust materials such as KTP, KTA and lithium niobate. KTA is used in preference to KTP for high average powers due to less absorption in the mid-IR wavelength region. Nonlinear materials such as zinc germanium phosphide and $AgGaSe_2$ can also be used, however, scaling to the necessary peak powers may be more difficult due to the lower damage threshold of these nonlinear materials and furthermore these materials have the disadvantage that they cannot be pumped at wavelengths shorter than 2 microns precluding the use of standard pump laser sources such Nd-doped solid state lasers. The materials KTP, KTA and lithium niobate may be periodically poled to enable higher nonlinearities to be accessed.

The efficiency of OPOs is typically 40-70% when considering the number output photons as a fraction of pump photons. Output energy in the output beam 1710 can be increased by increasing the energy in the pump beam 1706. In order to avoid optical damage to the elements of the OPO source, however, it may be necessary to also increase the size of the pump beam 1706 (i.e. the beam waist) in the nonlinear material 1701.

The linewidth and beam quality of the output beam 1710 from OPO pump sources will, in general, not meet the requirements for pumping a diamond Raman laser as described above, unless the system is carefully designed. The linewidth is determined by the bandwidth of the resonator optics and the phase-matching conditions in the nonlinear crystal 1701 (but will not be greater than the sum of the pump linewidth and the other signal/idler beam). The linewidth of the output beam 1710 can be constrained by restricting the range of frequencies of the pump beam 1706 and either the signal 1707 or idler 1709 beams as is well known by the skilled addressee. This is often achieved by using additional line selective elements within the OPO resonator 1703 such as a grating, prism or etalon (not shown).

In alternate arrangements as would be appreciated by the skilled addressee, the OPO 1700 and the pump beam source 1705 may share the same resonator in what is often called an intracavity OPO. This is often used in high pulse rate systems to enable efficient conversion at low pulse energy.

Figure 18A:
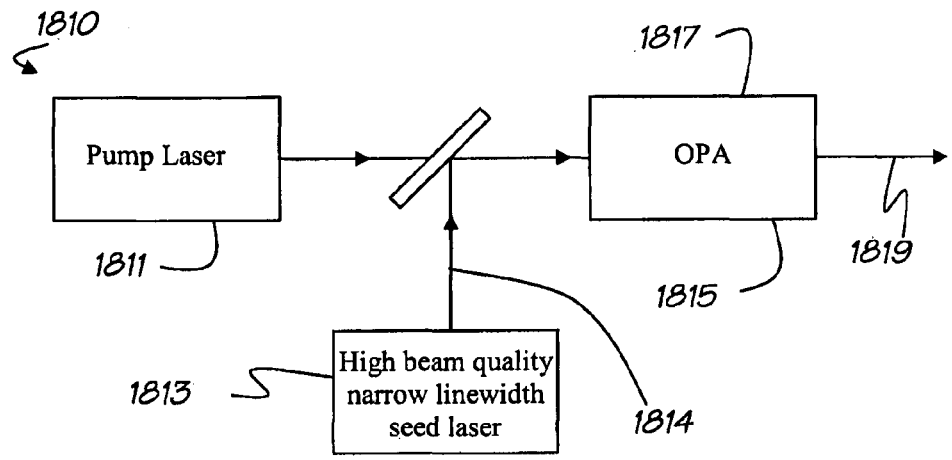
FIGS. 18A to 18C are schematic arrangements of alternative OPO pump sources for the diamond Raman laser system.
Figure 18B:
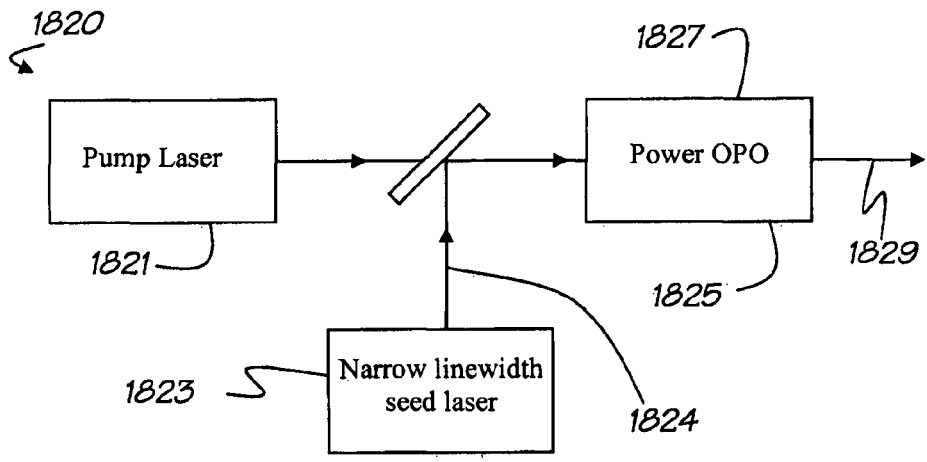

When scaling output energy in the output beam from the OPO by scaling of the spot size of the pump beam in the nonlinear material, it is often difficult to maintain high beam quality. Moreover, output scaling of narrow-linewidth OPOs is also difficult due the typically low damage threshold of line selective elements (e.g. gratings, prisms or etalons). A good method, for overcoming these problems is to use an injected seeded OPO 1810 as shown schematically in FIG. 18A or optical parametric amplifier (OPA) 1820 as shown schematically in FIG. 18B. By seeding the OPO or OPA (1817, 1827 respectively) with a seed beam (1814, 1824 respectively) from a master oscillator seed source (1813, 1823 respectively), the beam quality and spatial properties of the output (1819, 1829 respectively) from the OPO more closely resemble those of the seed beam (1814, 1824 respectively). Each of the OPO systems disclosed herein may also optionally include an amplification stage at the output (e.g. an optical parametric amplifier), to increase the optical power available for pumping the diamond Raman laser systems disclosed herein.

Operating the pump laser at low repetition rate may also be advantageous for increasing the optical peak power in the pump beam. The seed laser or master oscillator (1813, 1823 respectively) is often an OPO pumped by the same pump laser as the main "power" OPO or OPA, but could be a separate laser. An advantage of the injection seeded OPO arrangements is that much higher gains are possible so that very low injection energies are required.

There are many examples of OPOs with performance characteristics in the vicinity of the requirements for pumping the mid- to far-infrared diamond Raman lasers systems disclosed herein. For example:

Das [S. Das, IEEE Journal Of Quantum Electronics, Vol. 45, No. 9, September 2009] describes a good example of a 1064 nm pumped KTA OPO, with 10% conversion to 3.5 microns, pulse energies 2-5 mJ, pulse duration 10 ns and linewidths 0.5-2 $cm^{-1}$.

Wu [Rui Fen Wu, et al, "Multiwatt mid-IR output from a Nd:YALO laser pumped intracavity KTA OPO" Optics Express, Vol. 8, Issue 13, pp. 694-698] also describes an example of an intracavity 3.5 micron KTA OPO operating with 4 W of average power, which may be modified for suitability for pumping diamond Raman lasers and improved by increasing the pulse energy. This could be achieved by, for example, decreasing the pulse repetition rate, and reducing the linewidth by including a line selective element.

Johnson [B. C. Johnson, V. J. Newell, J. B. Clark, and E. S. McPhee, J. Opt. Soc. Am. B/Vol. 12, p 2122 (1995)] shows an injection seeded power OPO operating with simultaneously high pulse energy, narrow linewidth and high output beam quality. Johnson's design could be modified for suitability for generating the required mid-IR wavelengths by applying the design principles discussed therein to a mid-infrared OPO system.

Figure 18C:
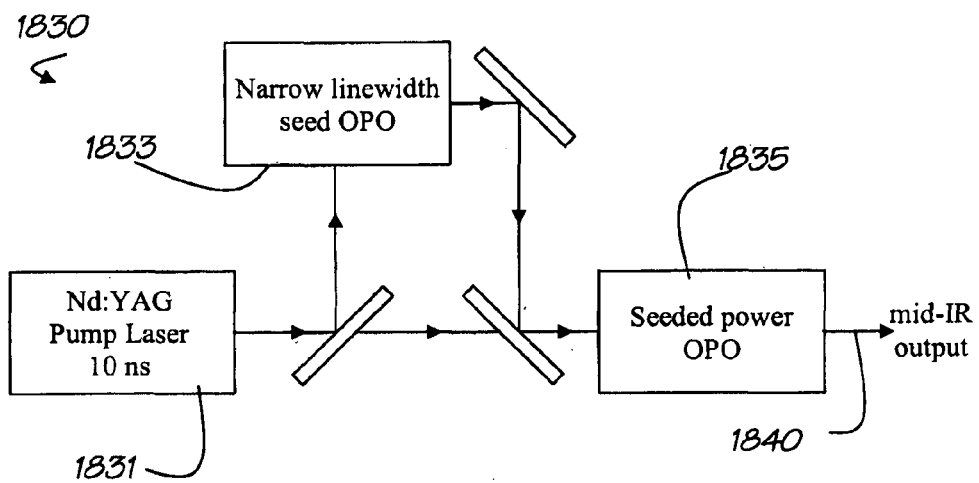

An example of a suggested practical design of an OPO pump source 1830 with an output beam 1840 aimed to satisfy the linewidth, beam quality and peak power requirements for pumping a mid- to far-infrared diamond Raman lasers systems disclosed herein is shown schematically in FIG. 18C. The schematic shows a single Nd;YAG pulsed laser source 1831 adapted to generate 10 ns pump pulses pumping a narrow linewidth seed OPO 1833 and a power OPO 1835 having an unstable resonator cavity. An unstable resonator has the advantage in laser systems for generating a better beam quality.

The techniques described above may be adapted to create suitable diamond Raman laser pump sources with wavelength in the range 5-7.5 microns.

Solid State Laser Pump Sources

As mentioned above, a solid state laser source with suitable wavelength and optical characteristics—i.e. wavelength between 3 and 7.5 µm, pulse energy between about 1 mJ and about 10 mJ, pulse duration between about 1 and 20 ns, linewidth approximately less than or equal to about 10 $cm^{-1}$ (for example between about 0.1 and about 10 $cm^{-1}$—for linewidths less than about 0.1 $cm^{-1}$, active line-narrowing may also be employed) and good beam quality (brightness)—may also be used to pump the diamond Raman laser systems disclosed herein. For example Er:YAG is a widely used laser material generating high energy and high power near 2.9 microns, and can be operated in Q-switched mode to generate high peak powers. An example source with a pump wavelength of about 3.8 µm can be realised by Raman shifting an Er:YAG laser using the 768 $cm^{-1}$ Raman shift of potassium gadolinium tungstate (KGW) to give a Raman converted output from the diamond Raman laser system of about 7.5 µm. Other nearby wavelengths are possible by changing the composition of the laser Er laser host (eg. Er:YSGG) or the tungstate Raman material in the pump source. Further potential sources of 3 to 4 micrometer pump light include Raman shifted output of holmium and thulium doped lasers (which are good sources of pump laser light near 2 microns). The holmium laser material Cr:Tm:Ho:YAG can be operated in Q-switched mode to generate high peak powers at 2.1 micrometers, which can then be Raman shifted to provide a pump wavelength in the 3 to 4 micrometer range.

Other solid state pump sources with output wavelengths in the range of between about 3 µm to about 7.5 µm may also be developed using suitable combinations of rare-earth-doped laser materials, i.e. a solid state host material (glass, crystal, polymer, or ceramic material) doped with a lanthanide (e.g. erbium, holmium, thulium, praseodymium, ytterbium) or other suitable impurity ion (e.g. cerium), together with suitable solid state nonlinear and/or Raman-active materials to convert the fundamental laser output from the laser material to a wavelength in the desired range for pumping of the diamond Raman laser system. Suitable material combinations would be readily selected by the skilled addressee, however, the pump source also would need to meet the pump beam quality requirements as discussed above in relation to the modelling of the diamond Raman laser systems for efficient operation thereof.

The diamond Raman laser systems and methods of operation described herein, and/or shown in the drawings, are presented by way of example only and are not limiting as to the scope of the invention. Unless otherwise specifically stated, individual aspects and components of the systems and methods described herein may be modified, or may have been substituted therefore known equivalents, or as yet unknown substitutes such as may be developed in the future or such as may be found to be acceptable substitutes in the future. The systems and methods described herein may also be modified for a variety of applications while remaining within the scope and spirit of the claimed invention, since the range of potential applications is great, and since it is intended that the present systems and methods described herein be adaptable to many such variations.

The invention claimed is:

1. A solid-state Raman laser system comprising:
a pump source for generating an input beam having an infrared wavelength in the range between 3 micrometers and 7.5 micrometers, wherein the pump source is adapted to generate a pulsed pump beam comprising pump pulses at a first wavelength of intensity between about 0.1 GW/cm$^2$ and about 60 GW/cm$^2$ and a pulse width between about 1 ns and 100 ns;
a solid-state diamond Raman material, the laser system being adapted to generate a Raman shifted output beam having an output wavelength in the range of 5.5 to 100 micrometers and being on the long wavelength side of a two-phonon absorption band in the solid-state diamond Raman material, the solid-state diamond Raman material having a nitrogen impurity content less than 10000 ppb.

2. A laser system as claimed in claim 1 wherein the output wavelength is in the range of between about 6 and about 12 micrometers.

3. A laser system as claimed in claim 1 wherein the output wavelength is in the range of between about 6 and about 8 micrometers.

4. A laser system as claimed in claim 1 wherein the first wavelength is on the short wavelength side of the two-phonon absorption band.

5. A laser system as claimed in claim 1 wherein the Raman shifted output beam is at a wavelength corresponding to a first Stokes shift in the Raman material.

6. A laser system as claimed in claim 1 wherein the pulse width is between about 1 ns and 10 ns.

7. A laser system as claimed in claim 1 wherein the input pump beam has a linewidth with a full width half maximum of less than 2 cm$^{-1}$.

8. A mid- to far-infrared solid-state Raman laser system comprising:
a pump source for generating a pump beam having a first wavelength in the range of 3 micrometers to 7.5 micrometers and being a pulsed pump beam comprising pump pulses at the first wavelength of intensity between 0.1 GW/cm$^2$ and 60 GW/cm$^2$ and a pulse width between about 1 ns and 100 ns;
a resonator cavity comprising: an input reflector adapted to be highly transmissive for light with the first wavelength for admitting the pump beam with the first wavelength into the resonator cavity;
a solid-state diamond Raman material located in the resonator cavity for Raman shifting the pump beam and generating a second wavelength in the range of 5.5 to 100 micrometers and being on the long wavelength side of a two-phonon absorption band in the solid-state diamond Raman material, the solid state Raman material having a nitrogen impurity content less than 10000 ppb; and
an output reflector adapted to be partially transmissive for light with the second wavelength on the long wavelength side of the two phonon-absorption band for resonating the second wavelength in the resonator without two-phonon absorption within the solid-state diamond Raman material and for outputting an output beam, the input reflector further being adapted to be highly reflective at the second wavelength for resonating the second wavelength in the resonator.

9. A system as claimed in claim 8 wherein the output reflector is between about 1% and about 80% transmissive at the second wavelength.

10. A system as claimed in claim 8 wherein the output reflector is between 20% and 50% transmissive at the second wavelength.

11. A system as claimed in claim 8 wherein the first wavelength is on the short wavelength side of the two-phonon absorption band.

12. A system as claimed in claim 8 wherein the Raman material is an undoped Raman material.

13. A system as claimed in claim 8 wherein the Raman material is either a single-crystal diamond material or an isotopically pure diamond material.

14. A system as claimed in claim 13 wherein the diamond Raman material is derived from a chemical vapour deposition fabrication process.

15. A system as claimed in claim 8 wherein the resonator cavity is a high finesse resonator cavity for light at the second wavelength, the finesse of the resonator cavity at the second wavelength being greater than 100.

16. A system as claimed in claim 8 wherein the second wavelength is either a first order Stokes wavelength, or a second order Stokes wavelength or any combination thereof.

17. A system as claimed in claim 8 wherein the laser system is a side-pumped laser system or a non-collinearly pumped laser system.

18. A laser system as claimed in claim 8 wherein the pump laser source is selected from the group of: an optical parametric oscillator, a solid state Raman-shifted thulium laser, a solid state Raman-shifted holmium laser, and a solid state Raman-shifted erbium laser.

19. A laser system as claimed in claim 8, wherein the Raman material comprises a waveguide for guiding light at the first and/or second wavelengths in the resonator cavity.

20. A laser system as claimed in claim 8 wherein the first wavelength is derived from a tunable source such that the second wavelength is tunable by tuning the first wavelength.

21. A laser system as claimed in claim 20 wherein the second wavelength is tunable through the range of about 5.5 micrometers to about 100 micrometers.

22. A laser system as claimed in claim 21 wherein the second wavelength is continuously tunable through the range of about 5.5 micrometers to about 100 micrometers.

23. A method of laser treatment using a laser system as claimed in claim 8, the method comprising:
providing the pump beam at a first wavelength of about 3.47 micrometers;
directing the pump beam into the resonator cavity and incident on the Raman material thereby inducing stimulated Raman scattering in the Raman material and generating the output beam with a second wavelength of about 6.45 micrometers; and
directing the output beam to a selected treatment area to perform a laser treatment to the treatment area.

24. A method of laser treatment as claimed in claim 23 wherein the method is adapted for neurosurgery.

25. A laser system as claimed in claim 5 wherein the first wavelength is on the short wavelength side of the two-phonon absorption.

26. A method of remote sensing using a laser system as claimed in claim 8, the method comprising:
   providing the pump beam at a first wavelength in the range of 3 to 7.5 micrometers;
   directing the pump beam into the resonator cavity and incident on the Raman material thereby inducing stimulated Raman scattering in the Raman material and generating the output beam having a second wavelength in the range of about 5.5 micrometers to about 100 micrometers;
   outputting the second wavelength from the resonator cavity as an output beam;
   directing the output beam towards an object or into an environment where an object or environmental substance is suspected to be located;
   detecting backscattered radiation from the object or environmental substance; and
   processing the detected radiation thereby sensing the presence or absence of the object or environmental substance.

27. A method for generating a mid- to far-infrared beam in a solid-state Raman laser system comprising:
   generating a pump beam having a first wavelength in the range of 3 micrometers to 7.5 micrometers and being a pulsed pump beam comprising pump pulses at the first wavelength of intensity between about 0.1 GW/cm$^2$ and about 60 GW/cm$^2$ and a pulse width between about 1 ns and 100 ns;
   providing a resonator cavity comprising:
   an input reflector adapted to be highly transmissive for light with the first wavelength for admitting the pump beam with the first wavelength into the resonator cavity;
   a solid-state diamond Raman material located in the resonator cavity for Raman shifting the pump beam and generating a second wavelength in the range of 5.5 to 100 micrometers and being on the long wavelength side of a two-phonon absorption band in the solid-state diamond Raman material; and an output reflector adapted to be partially transmissive for the second wavelength on the long wavelength side of the two-phonon absorption band for resonating the second wavelength in the resonator without two-phonon absorption within the solid-state diamond Raman material and for outputting an output beam, the input reflector further being adapted to be highly reflective at the second wavelength for resonating the second wavelength in the resonator, the solid-state diamond Raman material having a nitrogen impurity content less than 10000 ppb;
   directing the pump beam with the first wavelength into the resonator cavity and incident on the Raman material thereby inducing stimulated Raman scattering in the Raman material and generating the second wavelength; and
   outputting the output beam with the second wavelength from the resonator cavity.

28. A mid- to far-infrared solid state Raman laser system comprising:
   a pump source for generating a pump beam having a first wavelength in the range of 3 micrometers to 7.5 micrometers and being a pulsed pump beam comprising pump pulses at the first wavelength of intensity between 0.1 GW/cm$^2$ and 60 GW/cm$^2$ and a pulse width between about 1 ns and 100 ns;
   a resonator cavity comprising: an input reflector adapted to be highly transmissive for light with the first wavelength for admitting the pump beam with the first wavelength into the resonator cavity; and an output reflector adapted to be partially transmissive for light with a second wavelength in the range of 5.5 to 100 micrometers for resonating the second wavelength in the resonator and for outputting an output beam, the input reflector further being adapted to be highly reflective at the second wavelength for resonating the second wavelength in the resonator;
   a solid-state diamond Raman material located in the resonator cavity for Raman shifting the pump beam and generating the second wavelength, the solid-state diamond Raman material having a nitrogen impurity content less than 10000 ppb; and
   a heat sink in thermal contact with the solid-state diamond Raman material and operable to cool the solid-state diamond Raman material to reduce two-phonon absorption therein.

29. A method comprising the steps of:
   generating a pump beam for a solid-state Raman laser system comprising:
   a diamond Raman material and adapted to generate a Raman shifted output beam having an output wavelength in the range of 5.5 to 100 micrometers and being on the long wavelength side of a two-phonon absorption band in the solid-state diamond Raman material, the diamond Raman material having a nitrogen impurity content less than 10000 ppb, the pump beam having a first wavelength in the range of 3 micrometers to 7.5 micrometers and being a pulsed pump beam comprising pump pulses at the first wavelength of intensity between 0.1 GW/cm$^2$ and 60 GW/cm$^2$ and a pulse width between about 1 ns and 100 ns.

* * * * *

UNITED STATES PATENT AND TRADEMARK OFFICE
CERTIFICATE OF CORRECTION

PATENT NO. : 9,882,344 B2  Page 1 of 1
APPLICATION NO. : 13/580859
DATED : January 30, 2018
INVENTOR(S) : Richard Paul Mildren It is certified that error appears in the above-identified patent and that said Letters Patent is hereby corrected as shown below:

In the Claims

At Column 45, Line 3, Claim 25 should read:
25. A laser system as claimed in claim 8 wherein the first Signed and Sealed this
Tenth Day of April, 2018

Andrei Iancu
*Director of the United States Patent and Trademark Office*